(12) United States Patent
Wendland et al.

(10) Patent No.: US 8,501,854 B2
(45) Date of Patent: *Aug. 6, 2013

(54) TEMPLATED METAL OXIDE PARTICLES AND METHODS OF MAKING

(75) Inventors: Michael S. Wendland, North St. Paul, MN (US); Neal A. Rakow, Woodbury, MN (US); Mary I. Buckett, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/100,645

(22) Filed: May 4, 2011

(65) Prior Publication Data

US 2011/0207868 A1    Aug. 25, 2011

Related U.S. Application Data

(62) Division of application No. 12/438,162, filed as application No. PCT/US2007/078827 on Sep. 19, 2007, now Pat. No. 7,956,001.

(60) Provisional application No. 60/826,146, filed on Sep. 19, 2006.

(51) Int. Cl.
*C08K 3/22* (2006.01)
*C08L 25/06* (2006.01)
*C08L 29/10* (2006.01)
*H01B 1/20* (2006.01)
*H01B 1/02* (2006.01)

(52) U.S. Cl.
USPC ........... 524/432; 524/439; 524/430; 524/418; 977/779; 977/785; 252/519.3; 252/500; 252/518.1; 252/510

(58) Field of Classification Search
None
See application file for complete search history.

(56) References Cited

U.S. PATENT DOCUMENTS

| | | | |
|---|---|---|---|
| 5,780,251 | A | 7/1998 | Klainer |
| 5,938,934 | A | 8/1999 | Balogh |
| 6,288,197 | B1 | 9/2001 | Youngs |
| 6,350,384 | B1 | 2/2002 | Dvornic |
| 6,660,379 | B1 | 12/2003 | Lakowicz |
| 6,664,315 | B2 | 12/2003 | Tomalia |
| 6,995,234 | B2 | 2/2006 | Tomalia |
| 7,153,703 | B2 | 12/2006 | Peng |
| 7,273,904 | B2 | 9/2007 | Peng |

(Continued)

FOREIGN PATENT DOCUMENTS

| | | |
|---|---|---|
| EP | 0928813 | 7/1999 |
| JP | 05254819 | 10/1993 |

(Continued)

OTHER PUBLICATIONS

Briois, "Solid-State and Solution Structural Study of Acetylacetone-Modified Tin(IV) Chloride Used as a Precursor of $SnO_2$ Nanoparticles Prepared by a Sol-Gel Route", Chem Mater, 2004, vol. 16, No. 20, pp. 3885-3894.

(Continued)

*Primary Examiner* — Yun Qian
(74) *Attorney, Agent, or Firm* — Jean A. Lown

(57) ABSTRACT

Composite particles of a metal oxide particle within a crosslinked, cored dendrimer are described. Additionally, methods of making the composite particles and compositions that contain the composite particles are described.

9 Claims, 3 Drawing Sheets

(56) References Cited

U.S. PATENT DOCUMENTS

| | | | |
|---|---|---|---|
| 7,344,583 B2 | 3/2008 | Wendland | |
| 7,413,607 B2 | 8/2008 | Rakow | |
| 7,588,701 B2 * | 9/2009 | Rakow et al. | 252/519.3 |
| 7,956,001 B2 | 6/2011 | Wendland | |
| 2001/0011109 A1 | 8/2001 | Tomalia | |
| 2002/0029969 A1 | 3/2002 | Yager | |
| 2002/0045614 A1 | 4/2002 | Becker | |
| 2002/0045714 A1 | 4/2002 | Tomalia | |
| 2004/0101976 A1 | 5/2004 | Peng | |
| 2005/0004293 A1 | 1/2005 | Peng | |
| 2005/0025820 A1 | 2/2005 | Kester | |
| 2006/0177376 A1 | 8/2006 | Tomalia | |
| 2006/0219159 A1 | 10/2006 | Rakow | |
| 2008/0152911 A1 | 6/2008 | Wendland | |

FOREIGN PATENT DOCUMENTS

| | | |
|---|---|---|
| JP | 11-263837 | 9/1999 |
| JP | 2001-508484 | 6/2001 |
| JP | 2002-536285 | 10/2002 |
| JP | 2003/064281 | 3/2003 |
| WO | 98/30604 | 7/1998 |
| WO | 00/46839 | 8/2000 |
| WO | 02/066575 | 8/2002 |
| WO | 03/078699 | 9/2003 |
| WO | 2004/020448 | 3/2004 |
| WO | 2004/031732 | 4/2004 |
| WO | 2004/081072 | 9/2004 |
| WO | 2006/105029 | 10/2006 |

OTHER PUBLICATIONS

Brust, "Synthesis of Thiol-derivatised Gold Nanoparticles in a Two-phase Liquid-Liquid System", J. Chem. Soc., Chem. Commun., 1994, pp. 801-802.

Chan, "Quantum Dot Bioconjugates for Ultrasensitive Nonisotopic Detection", Science, Sep. 25, 1998, vol. 281, Issue 5385, pp. 2016-2018.

Chaneac C. et al: "Hybrid composite materials containing magnetic iron oxide nanoparticles", *Materials Research Society Symposium Proceedings, Materials Research Society*, Pittsburg, PA, US, vol. 628, 2000, pp. CC641-CC646, XP008088032, ISSN: 0272-9172, abstract.

Crooks, "Dendrimer-Encapsulated Metal Nanoparticles: Synthesis, Characterization, and Applications to Catalysis", Accounts of Chemical Research, Mar. 2001, vol. 34, No. 3, pp. 181-190.

Fahlman, "Facile Synthesis of Tin Oxide Nanoparticles Stabilized by Dendritic Polymers", Journal of the American Chemical Society, Jan. 18, 2006, vol. 128, No. 2, pp. 420-421, XP002473727, (publication date: Dec. 21, 2005).

Gopidas, "Nanoparticle-Cored Dendrimers: Synthesis and Characterization", J. Am. Chem. Soc., May 28, 2003, vol. 125, No. 21, pp. 6491-6502.

Guo, "Luminescent CdSe/CdS Core/Shell Nanocrystals in Dendron Boxes: Superior Chemical, Photochemical and Thermal Stability", J. Am. Chem. Soc., Apr. 2, 2003, vol. 125, No. 13, pp. 3901-3909.

Guo, "Conjugation Chemistry and Bioapplications of Semiconductor Box Nanocrystals Prepared via Dendrimer Bridging", Chemistry of Materials, 2003, vol. 15, No. 16, pp. 3125-3133.

Hanus, "Aggregation Kinetics of Dendrimer-Stabilized CdS Nanoclusters", Langmuir, Mar. 21, 2000, vol. 16, No. 6, pp. 2621-2626.

Jiang, "Size-Controllable Synthesis of Monodispersed $SnO_2$ Nanoparticles and Application in Electrocatalysts", J. Phys. Chem. B, 2005, vol. 109, No. 18, pp. 8774-8778.

Murray, "Synthesis and Characterization of Nearly Monodisperse CdE (E = S, Se, Te) Semiconductor Nanocrystallites", J. Am. Chem. Soc., 1993, vol. 115, No. 19, pp. 8706-8715.

Nakamoto, "Tin Oxide and Indium Oxide Nanoparticles Prepared by the Controlled Thermolysis of Tin and Indium Complexes", Kagaku to Kogyo, 2004, vol. 78, No. 9, pp. 503-508. (Abstract).

G. R. Newkome, Dendrimers and Dendrons: Concepts, Syntheses, Applications, Wiley-VCH, New York, pp. 1-623 (2001).

Nlate, "Synthesis of 9- and 27-Armed Tetrakis (diperoxotungsto)phosphate-Cored Dendrimers and Their Use as Recoverable and Reusable Catalysts in the Oxidation of Alkenes, Sulfides, and Alcohols with Hydrogen Peroxide", Chemistry: A European Journal, Jan. 11, 2006, vol. 12, No. 3, pp. 903-914, XP002473728, pp. 905-907.

Schultz, "Synthesis of Cored Dendrimers with Internal Cross-Links", Angew. Chem. Int. Ed., 2001, vol. 40, No. 10, pp. 1962-1966.

Scott, "Synthesis, Characterization, and Applications of Dendrimer-Encapsulated Nanoparticles", J. Phys. Chem. B, 2005, vol. 109, No. 2, pp. 692-704.

Seto, "XAFS studies of Tb or Eu cored dendrimer complexes with various properties of luminescence", Journal of Synchrotron Radiation Munksgaard International Booksellers and Publishers for Int. Union Crystallogr Denmark, vol. 8, Mar. 1, 2001, pp. 710-712, XP002395552, ISSN: 0909-0495.

Shen, "PEG-assisted synthesis of $SnO_2$ nanoparticles", Materials Letters, 2004, vol. 58, pp. 3761-3764.

Shon, "Nanoparticle-Cored Dendrimers Synthesized from Functionalized Gold Nanoparticles", Polymeric Materials: Science & Engineering, 2004, vol. 91, pp. 1068.

Spanhel, "Semiconductor Clusters in the Sol-Gel Process: Quantized Aggregation, Gelation, and Crystal Growth in Concentrated ZnO Colloids", J. Am. Chem. Soc., 1991, vol. 113, No. 8, pp. 2826-2833.

Tominaga, "A Photocrosslinkable Dendrimer Consisting of a Nucleobase", Chemistry Letters, 2000, pp. 374-375.

Wang, "Cinnamoyl Shell-Modified Poly(amidoamine) Dendrimers", Journal of Polymer Science: Part A: Polymer Chemistry, 2000, vol. 38, pp. 4147-4153.

Wendland, "Synthesis of Corded Dendrimers", J. Am. Chem. Soc., 1999, vol. 121, No. 6, pp. 1389-1390.

Zhu, "Sonochemical Synthesis of $SnO_2$ Nanoparticles and Their Preliminary Study as Li Insertion Electrodes", Chem. Mater., 2000, vol. 12, No. 9, pp. 2557-2566.

Zimmerman, "Synthetic Hosts by Monomolecular Imprinting Inside Dendrimers", Nature, Jul. 25, 2002, vol. 418, pp. 399-403.

International Search Report for PCT/US2007/078827, 4 pages.

* cited by examiner

TEMPLATED METAL OXIDE PARTICLES AND METHODS OF MAKING

RELATED APPLICATIONS

This application is a divisional application of U.S. patent application Ser. No. 12/438,162, now U.S. Pat. No. 7,956,001 which is a national stage filing under 35 U.S.C. 371 of PCT/US2007/078827 filed Sep. 19, 2007, which claims priority to U.S. Provisional Patent Application No. 60/826,146 filed on Sep. 19, 2006, the disclosures of which are incorporated herein by reference in its entirety.

BACKGROUND

Metal oxide particles in the nanometer size range (e.g., 1 to 100 nanometers or 1 to 10 nanometers) are of increasing interest in a variety of applications such as catalysis, electronic devices, and sensors. Many of the methods used to prepare metal oxide particles in this size range, however, are problematic.

Metal oxide particles in the nanometer size range have been prepared by reacting metal-containing precursors under various conditions. For example, tin oxide nanoparticles have been produced using a variety of techniques, such as, thermolysis of organometallic precursors such as described, for example, in Nakamoto et al., *Kagaku to Kogyo*, 78, 503 (2004); sol-gel processes as described, for example, in Briois et al., *Chem. Mater.*, 16, 3885 (2004); oxidation of $SnCl_2$ as described, for example, in Jiang et al., *J. Phys. Chem. B*, 109, 8774 (2005); sonochemistry as described, for example, in Zhu et al., *Chem. Mater.*, 12, 2557 (2000); and hydrothermal processes as described, for example, in Shen et al., *Mater. Lett.*, 58, 3761 (2004).

Other metal oxides, such as zinc oxide, have been prepared by solution phase methods where a metal salt is reacted with hydroxide ions as described, for example, by Spanhel and Anderson, *J. Am. Chem. Soc.*, 113, 2826 (1991). With these methods, control over particle size requires control over the rate of nucleation and growth from a supersaturated solution as well as the use of processes such as coarsening, oriented attachment, and aggregation.

While these methods are effective for producing particles in the nanometer size range (typically, greater than 10 nanometers), the particle surfaces are usually passivated (i.e., surface functionalized). A passivated metal oxide tends to be less effective than a non-passivated metal oxide in applications such as catalysis or sensing.

Metal oxide particles in the nanometer size range have been prepared within dendritic structures. The dendritic structures have been loaded with metal oxoanions from a soluble metal oxoanion salt and then reacted to produce metal oxide particles. These metal oxide particles are typically coordinated on the outer surface by functional groups within the dendritic structure. Such coordination can disadvantageously affect the utility of the metal oxide particles for various applications such as catalysis or sensing.

SUMMARY OF INVENTION

Metal oxide particles and a method of making metal oxide particles in the nanometer size range are disclosed. More specifically, the metal oxide particles are formed within a crosslinked dendritic structure that has the core organic material (e.g., the zero generation material) or the core organic material plus other lower generation material removed.

In a first aspect, a method of making metal oxide particles is provided. The method involves providing a dendrimer that contains a core organic material, a first dendron bonded to the core organic material through a first attachment group that can be chemically cleaved, and a second dendron bonded to the core organic material through a second attachment group that can be chemically cleaved. The first dendron has at least two first crosslinkable groups and the second dendron has at least two second crosslinkable groups. The method further involves forming a crosslinked dendrimer by reacting the first crosslinkable groups and the second crosslinkable groups; cleaving by a chemical reaction both the first attachment group and the second attachment group; removing the core organic material or a derivative thereof from the crosslinked dendrimer to form a cored dendrimer having interior end groups; forming a bound metal-containing precursor by reacting a metal-containing precursor with at least one interior end group within a central region of the cored dendrimer; and reacting the bound metal-containing precursor to form a metal oxide particle within the central region of the cored dendrimer.

In a second aspect, a composite particle is provided that includes a metal oxide particle within a central interior region of a cored dendrimer. The cored dendrimer has crosslinked dendrons surrounding the central interior region, and the central interior region is free of organic material.

In a third aspect, a composition is provided that includes an organic matrix and a composite particle in the organic matrix. The composite particle includes a metal oxide particle within a central interior region of a cored dendrimer. The cored dendrimer has crosslinked dendrons surrounding the central interior region, and the central interior region is free of organic material.

The term "dendron" refers to a molecular structure having a plurality of molecular branching groups that divide a single molecular chain into two or more molecular chains. Additional branching groups can further divide a previously divided molecular chain. The molecular chains can be aromatic, aliphatic, heterocyclic, or a combination thereof.

The term "dendrimer" or "dendritic structure" refers to a molecular structure that includes at least two dendrons attached to a central molecular species (i.e., the core organic material).

The term "crosslinked dendrimer" refers to a dendrimer in which at least two molecular chains of one dendron are crosslinked to molecular chains of one or more other dendrons. Optionally, a molecular chain within one dendron can be crosslinked to another molecular chain within the same dendron. The crosslinks can be along the length of a molecular chain or can be at the outer periphery of a molecular chain of a dendron.

The term "cored dendrimer" refers to a crosslinked dendrimer that has been chemically reacted to remove an interior region. That is, the core organic material (i.e., central molecular species) or derivative thereof has been removed from the crosslinked dendrimer to form the cored dendrimer. The cored dendrimer can resemble a crosslinked polymeric sphere that is partially hollow (i.e., the central region of the cored dendrimer is hollow and free of organic material).

The term "coordinating" or "coordination" refers to forming a covalent bond between two species where one of the species contributes both electrons. Such a bond is sometimes referred to as a dative bond, as a "coordinative covalent bond", as a "coordinative bond", or as "coordinated".

The term "hydrogen bond" refers to an electrostatic interaction of hydrogen of a highly polarized bond (e.g., O—H or N—H) and a lone pair of electrons of a small electronegative atom (e.g., fluorine, oxygen, or nitrogen) in a neighboring molecule or in another functional group.

The term "ionic bond" refers to an electrostatic interaction of ions of opposite charge.

The term "van der Waals forces" refers to a weak attractive force between atoms or nonpolar molecules caused by a temporary change in the dipole moment of one atom or molecule inducing a similar change in an adjacent atom or molecule.

The term "acyl" refers to a monovalent group of formula —(CO)$R^a$ where $R^a$ is an alkyl, aryl, or heterocycle group and where (CO) used herein indicates that the carbon is attached to the oxygen with a double bond.

The term "acyloxy" refers to a monovalent group of formula —O(CO)$R^a$ where $R^a$ is an alkyl, aryl, or heterocycle group.

The term "acyloxycarbonyl" refers to a monovalent group of formula —(CO)O(CO)$R^a$ where $R^a$ is an alkyl, aryl, or heterocycle group.

The term "alkyl" refers to a monovalent group formed from an alkane and includes groups that are linear, branched, cyclic, or combinations thereof. The alkyl group typically has 1 to 30 carbon atoms. In some embodiments, the alkyl group contains 1 to 20 carbon atoms, 1 to 10 carbon atoms, 1 to 6 carbon atoms, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl. The alkyl group can be unsubstituted or substituted with one or more substituents selected, for example, from hydroxy, alkoxy, amino, aryl, or halo groups.

The term "alkoxy" refers to a monovalent group of formula —O$R^b$ where $R^b$ is an alkyl.

The term "amino" refers to a monovalent group of formula —NH$R^c$ where $R^c$ is hydrogen, alkyl, aryl, or heterocycle.

The term "aryl" refers to a monovalent aromatic carbocyclic radical. The aryl can have one aromatic ring or can include up to 5 carbocyclic ring structures that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl. An aryl group can be unsubstituted or substituted, for example, with one or more substituents selected, for example, from alkyl, alkoxy, halo, hydroxy, amino, or combinations thereof.

The term "borono" refers to a group of formula —B(OH)$_2$.

The term "carbonyl" refers to a divalent group of formula —(CO)— where there is a double bond between the carbon and oxygen.

The term "carboxy" refers to a monovalent group of formula —(CO)OH. The term "chlorophosphono" refers to a monovalent group of formula —OP(O)(O$R^c$)Cl where $R^c$ is hydrogen, alkyl, aryl, or heterocycle.

The term "chlorophosphito" refers to a monovalent group of formula —OP(O$R^c$)Cl where $R^c$ is hydrogen, alkyl, aryl, or heterocycle.

The term "chlorosulfonyl" refers to a monovalent group of formula —SO$_2$Cl. The term "chlorosilyl" refers to a monovalent group of formula —Si$R^d{}_2$Cl where each $R^d$ is independently an alkyl, aryl, or alkoxy.

The term "formyl" refers to a monovalent group of formula —(CO)H. The term "halo" refers to a monovalent group of formula —F, —Cl, —Br, or —I.

The term "halocarbonyl" refers to a monovalent group of formula —(CO)X where X is a halo. A chlorocarbonyl is one example of a halocarbonyl group.

The term "heterocycle" or "heterocyclic" refers to a cyclic group or cyclic compound that is aromatic or non-aromatic and that contains at least one heteroatom selected from O, N, S, P, or Si. The heterocyclic group or compound can include one ring or can contain up to 5 rings, up to 4 rings, up to 3 rings, or 2 rings that are fused or connected where at least one ring contains a heteroatom. Exemplary heterocyclic groups or compounds contain up to 20 carbon atoms, up to 15 carbon atoms, up to 10 carbon atoms, or up to 5 carbon atoms and up to 5 heteroatoms, up to 4 heteroatoms, up to 3 heteroatoms, or up to 2 heteroatoms. Some heterocyclic groups are five-membered rings or six-membered rings with 1, 2, or 3 heteroatoms.

The term "hydroxy" refers to a monovalent group of formula —OH.

The term "isocyanto" refers to a monovalent group of formula —NCO.

The term "metal oxoanion" refers to a polyatomic anion that contains a metal and oxygen. The metal oxoanion can be in the form of a salt, acid, or acid salt.

The term "mercapto" refers to a monovalent group of formula —SH.

The term "phosphono" refers to a monovalent group of formula —P(O)(OH)(O$R^c$) where $R^c$ is hydrogen, alkyl, aryl, or heterocylic. A phosphono group is attached to a carbon atom.

The term "phosphate" refers to a monovalent group of formula —OP(O)(OH)(O$R^c$) where $R^c$ is hydrogen, alkyl, aryl, or heterocyclic.

The term "phosphonamino" refers to a monovalent group of formula —NHP(O)(OH)(O$R^c$) where $R^c$ is hydrogen, alkyl, aryl, or heterocyclic.

The term "silanol" refers to a monovalent group of formula —Si$R^d{}_2$(OH) where each $R^d$ is independently alkyl, aryl, or alkoxy.

The term "sulfamino" refers to a monovalent group of formula —NHS(O)$_2$(OH). cAs used herein the term "sulfono" refers to monovalent group of formula —S(O)$_2$(OH).

The above summary of the present invention is not intended to describe each disclosed embodiment or every implementation of the present invention. The Figures, Detailed Description, and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
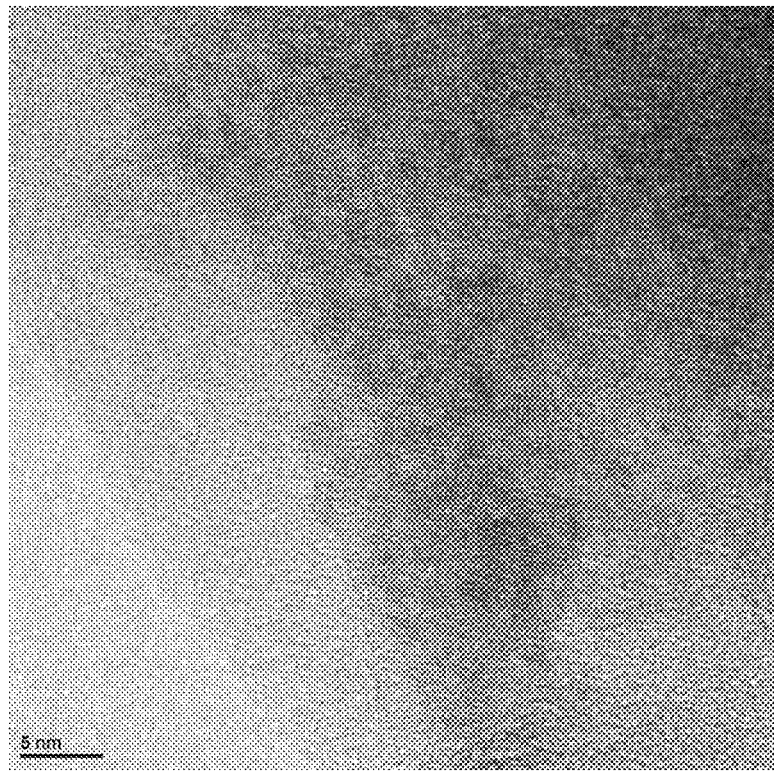
FIGS. 1A and 1B are transmission electron micrographs of a composite particle that contains tin oxide.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Composite particles that include metal oxide particles within a central region of a cored dendrimer are described.

The cored dendrimer can function as a template for the formation of metal oxide particles and typically defines the maximum size of the metal oxide particles.

In one aspect, a method of making metal oxide particles is disclosed. A dendrimer is provided that includes a core organic material, a first dendron bonded to the core organic material through a first attachment group that can be chemically cleaved, and a second dendron bonded to the core organic material through a second attachment group that can be chemically cleaved. Each dendron has at least two crosslinkable groups (the first dendron has at least two first crosslinkable groups and the second dendron has at least two second crosslinkable groups). At least two of the first crosslinkable groups and at least two of the second crosslinkable groups are reacted to form a crosslinked dendrimer. After formation of the crosslinked dendrimer, the first attachment group and the second attachment group are cleaved by a chemical reaction. The core organic material or a derivative of the core organic material is removed from the crosslinked dendrimer to form a cored dendrimer having interior end groups. A bound metal-containing precursor is formed by reacting a metal-containing precursor with at least one of the interior end groups within a central region of the cored dendrimer. The bound metal-containing precursor is then reacted to form a metal oxide particle within the central interior region of the cored dendrimer.

One embodiment of the method is shown schematically in Reaction Scheme A. In this reaction scheme, three dendrons are bonded to the central core organic material through attachment groups. The bonding of the dendrons to the core organic material results in the formation of a dendrimer (i.e., Structure I). The attachment groups (shown by complementary structures for a triangle, square, and circle in Structure I) can be the same or different (e.g., as shown, the attachment groups are different). The X groups on each dendron represent groups that are crosslinkable (e.g., as shown, each dendron has two crosslinkable groups). The E groups represent the peripheral groups (i.e., the end groups furthest from the core organic material) at the outer periphery of the branched molecular chains in the dendrons. Structure II schematically represents the crosslinked dendrimer (i.e., the C—C bond is used to represent the crosslinks formed between two dendrons). Structure III schematically represents the cored dendrimer (i.e., the cored dendrimer has the core organic material removed from a crosslinked dendrimer and has internal end groups that can be reacted with a metal-containing precursor). The internal end groups within the cored dendrimer can be the same or different than the groups on the dendrons originally reacted with the core organic material. As shown, the circle, triangle, and square in Structure III represent the end groups within the interior of the cored dendrimer (i.e., interior end groups). Structure IV schematically represents a metal oxide particle within the interior of the cored dendrimer.

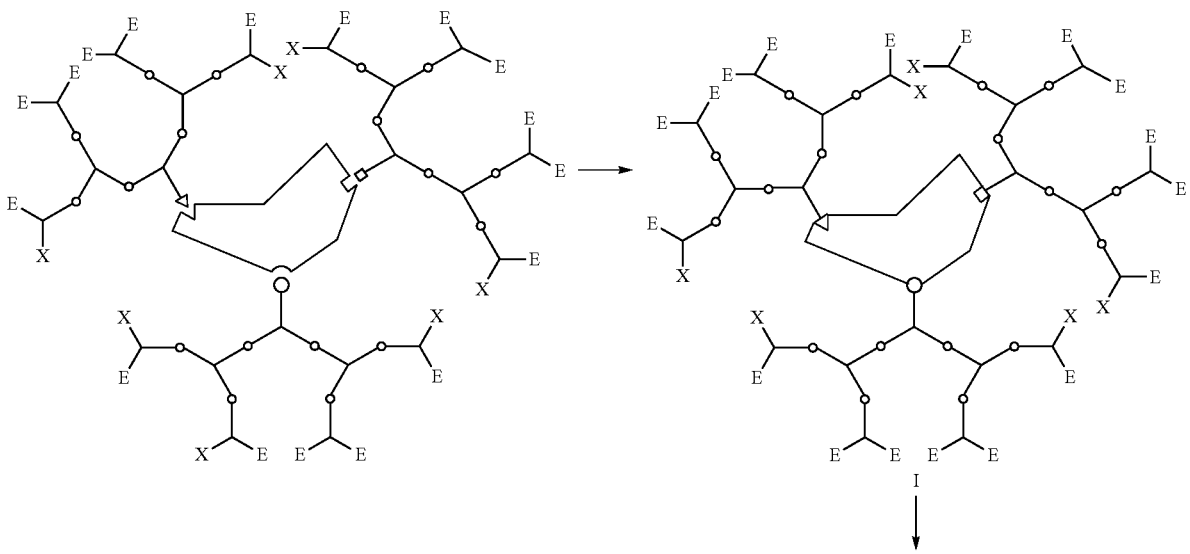

Reaction Scheme A

I

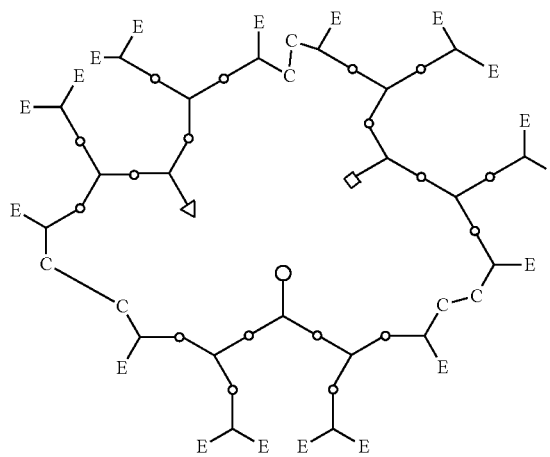

III

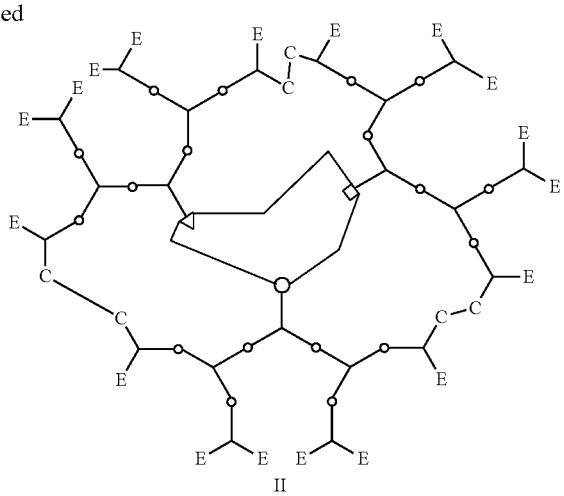

II

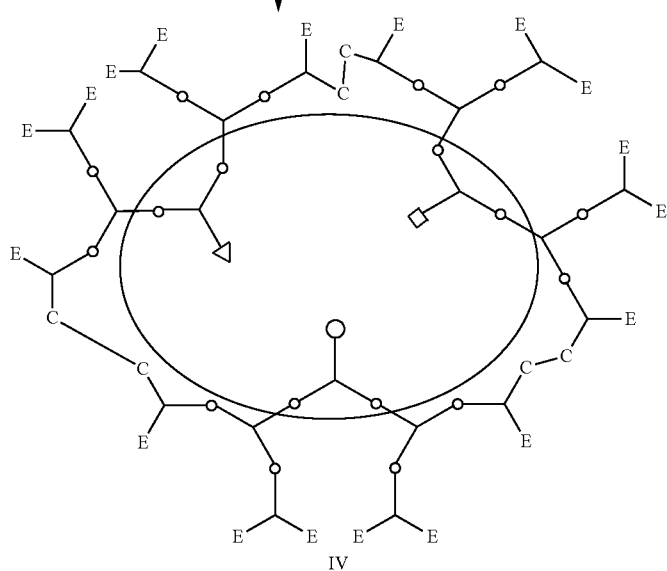

IV

The outer surface of the metal oxide particle is not bonded to the cored dendrimer (i.e., the outer surface of the metal oxide particle is free of coordinative bonds or ionic bonds to the cored dendrimer). The size of the metal oxide particle in Structure IV is often no greater than an outer dimension of the cored dendrimer.

The core organic material (i.e., the central organic material of a dendrimer) can be aliphatic, aromatic, heterocyclic, or a combination thereof and has at least two reactive groups that can form a covalent bond by reacting with a functional group on a dendron. Suitable core organic materials often contain up to 100 carbon atoms, up to 90 carbon atoms, up to 80 carbon atoms, up to 70 carbon atoms, up to 60 carbon atoms, up to 50 carbon atoms, up to 40 carbon atoms, up to 30 carbon atoms, up to 20 carbon atoms, or up to 10 carbon atoms. Some core organic materials contain at least three, at least four, at least five, at least six, at least seven, or at least eight reactive groups. Each reactive group of the core organic material can be a bonding site for a dendron. Exemplary reactive groups include, but are not limited to, hydroxy, halo, carboxy, halocarbonyl, amino, mercapto, sulfono, sulfamino, phosphono, phosphonamino, acyl, borono, silanol, chlorosilyl, trifluoromethylsulfonatesilyl, chlorosulfonyl, chlorophosphono, chlorophosphito, and isocyanto.

In some embodiments, the core organic material includes an aromatic compound having at least three reactive groups. The aromatic compound can be carbocyclic or heterocyclic and can have multiple rings. Exemplary carbocyclic aromatic compounds include substituted benzene compounds such as 1,3,5-tris-hydroxy-benzene; 1,3,5-tris-hydroxymethyl-benzene; 1,3,5-tris-bromomethyl-benzene; 1,3,5-benzenetricarboxylic acid chloride; and the like. Exemplary carbocyclic aromatic compounds having multiple rings include, but are not limited to, 1,4-bis[3,5-dihydroxybenzoyloxy]benzene; 1,1,1-tris(4-hydroxyphenyl)ethane; 1,1,1-tris {4-[4,4-bis(4-hydroxyphenyl)pentoxy]phenyl}ethane; and cyclophanes. Exemplary heterocyclic aromatic compounds include substituted porphine compounds such as 5,10,15,20-tetrakis(4-hydroxyphenyl)-21H,23H-porphine, 5,10,15,20-tetrakis(2,6-dihydroxylphenyl)-21H,23H-porphine, and 5,10,15,20-tetrakis(3,5-dihydroxylphenyl)-21H,23H-porphine.

In other embodiments, the core organic material includes an aliphatic compound having at least three reactive groups. Exemplary aliphatic compounds include substituted alkanes such as 2-ethyl-2-hydroxymethyl-propane-1,3-diol; 2,2-bis-hydroxymethyl-propane-1,3-diol (i.e., pentaerythritol); 1,3-dibromo-2,2-bis-bromomethyl-propane; 3-[3-(2-chlorocarbonyl-ethoxy)-2,2-bis-(2-chlorocarbonyl-ethyoxymethyl)-propoxy]-propionyl chloride; pentaerythritol ethoxylate (i.e., $C[CH_2(OCH_2CH_2)_nOH]_n$ where n is an integer of 1 to 10); pentaerythritol propoxylate (i.e., $C[CH_2[OCH_2CH(CH_3)]_n OH]_4$ where n is an integer of 1 to 10); and the like.

The dendrimer can be formed using a divergent or convergent methodology. In a divergent methodology, the dendritic structure is typically constructed through sequential addition of monomers beginning with the core organic material and radiating outward. The core organic material can be referred to as the zero generation. If enough monomer is added to react with all of the reactive sites on the core organic material, the first generation dendritic structure is formed. A monomer with at least two additional reaction sites can function as a branching group that splits a single molecular chain into two or three molecular chains. Repetitive addition of more monomer results in the formation of second, third, fourth, fifth, and higher generation dendritic structures. In a convergent methodology, the dendrons are synthesized and then covalently bonded to the core organic material.

The dendrons can be aromatic, aliphatic, or combinations thereof and can have a plurality of branching groups. The dendrons can include heteroatoms. Some exemplary dendrons are poly(ethers), poly(esters), poly(thioethers), poly(arylalkylene ethers), poly(amidoamines), poly(alkylene imine), and the like. The reference by G. R. Newkome et al., *Dendrimers and Dendrons: Concepts, Synthesis, Applications*, Wiley-VCH, New York, pp. 1-623 (2001) describes these and other suitable dendrons.

In some embodiments, the dendrons are poly(ethers) such as, for example, poly(benzyl ethers). For example, the dendrons can have a structure such as or higher generation analogues thereof. In this exemplary third generation dendron, the crosslinkable groups are alkenyl groups and the local functional group that can react with the core organic material is a carboxy group. The benzene ring with the carboxy group is the first generation region of the dendron. This dendron and other suitable exemplary dendrons are described further in S. C. Zimmerman et al., *Nature*, vol. 418, 399-403 (2002) and Wendland et al., *J. Am. Chem. Soc.*, 121, 1389-1390 (1999).

Each dendron has a focal functional group that can be combined with a reactive group of the core organic material to form an attachment group linking the dendron to the core organic material. The bonding of two or more dendrons to the core organic material results in the formation of a dendrimer. The attachment group is typically a group that contains a chemical bond that can be cleaved (i.e., reacted) to provide an end group within the interior of the cored dendron that is capable of bonding with a metal-containing precursor (e.g., capable of forming a coordinative bond, ionic bond, hydrogen bond, or interaction through van der Waals forces with the metal-containing precursor). Suitable attachment groups are those that can be attached to the core organic material such that the resulting chemical bond can be cleaved to form an end group such as, for example, a carboxy, hydroxy, amino, mercapto, sulfono, sulfamino, phosphono, phosphonamino, phosphate, borono, silanol, formyl, or acyl within the interior of the cored dendrimer.

The attachment group links the dendrons to the core organic material. Each linkage can be represented by the formula Den-A-Core where Den represents the dendron, A represents the attachment group, and Core represents the core organic material. Each core has at least two such linkages (i.e., each dendrimer

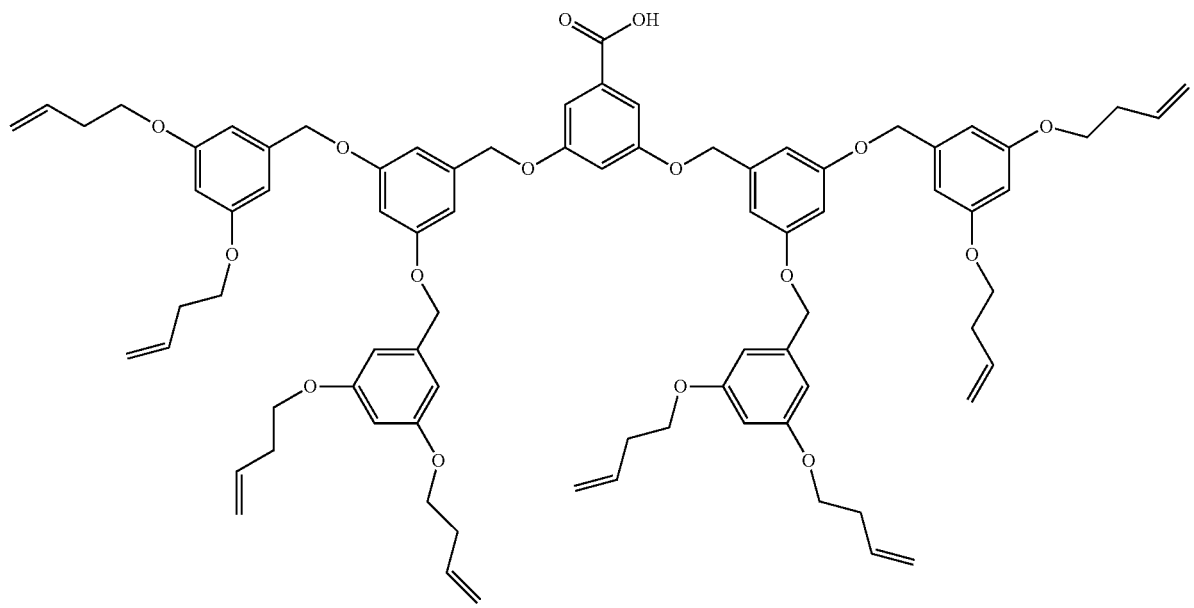 [SMILES: C=CCCOc1cc(COc2cc(COc3cc(OCc4cc(OCc5cc(OCCC=C)cc(OCCC=C)c5)cc(OCc5cc(OCCC=C)cc(OCCC=C)c5)c4)cc(C(=O)O)c3)cc(OCc3cc(OCCC=C)cc(OCCC=C)c3)c2)cc(OCCC=C)c1]

has at least two dendrons attached to the core organic material). For ease of discussion, however, the formula shows only one of the two or more linkages to the core organic material.

The linkage denoted by Den-A-Core can be, for example, an anhydride of formula

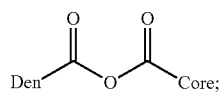

a mixed anhydride formed from a carboxylic acid and sulfonic acid of formula

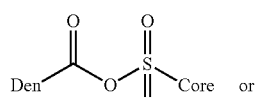
(1)

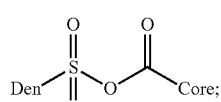
(2)

a carboxylate ester of formula

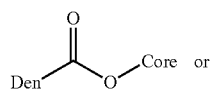
(1)

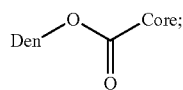
(2)

a thioester of formula

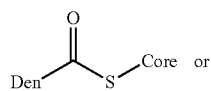
(1)

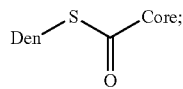
(2)

a dithioester of formula

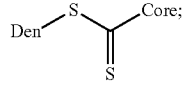

a succinimide ester of formula

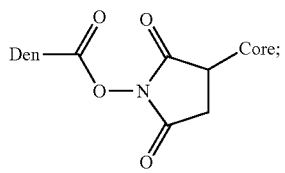

an amide of formula

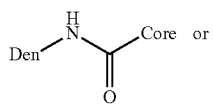
(1)

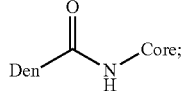
(2)

a thioamide of formula

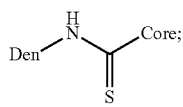

a carbonate of formula

a dithiocarbonate-O-ester of formula

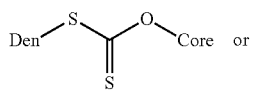
(1)

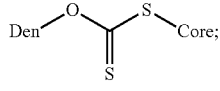
(2)

a carbamate of formula

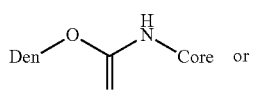
(1)

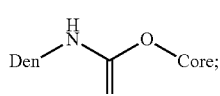
(2)

a thiocarbamate-O-ester of formula

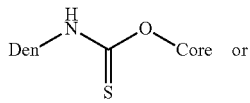

a thiocarbamate-5-ester of formula

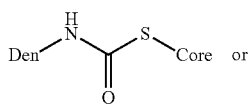

a dithiocarbamate of formula

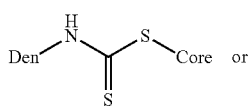

a sulfonate of formula

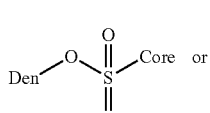

a sulfamide of formula

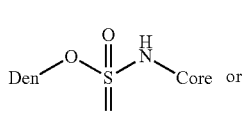

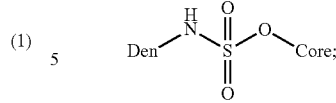

a sulfonamide of formula

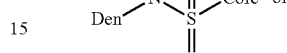

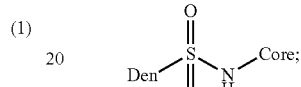

a phosphonate of formula

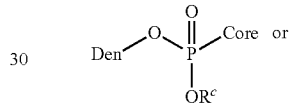

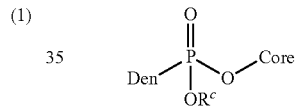

where $R^c$ is hydrogen, alkyl, aryl, or heterocyclic; a thiophosphonate of formula

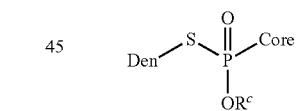

where $R^c$ is hydrogen, alkyl, aryl, or heterocyclic; a phosphoramidate of formula

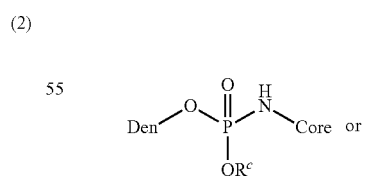

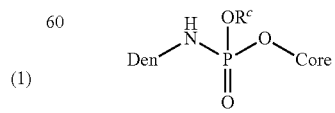

where $R^c$ is hydrogen, alkyl, aryl, or heterocyclic;

a thiophosphonamide of formula

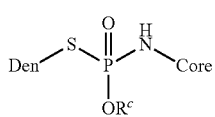

where $R^c$ is hydrogen, alkyl, aryl, or heterocyclic;
a phosphoramidite of formula

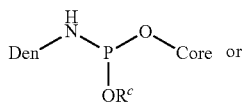   (1)

or (2)

where $R^c$ is hydrogen, alkyl, aryl, or heterocyclic;
a phosphate of formula

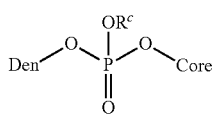

where $R^c$ is hydrogen, alkyl, aryl, or heterocyclic;
a siloxane of formula

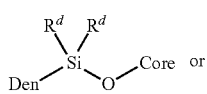   (1)

or

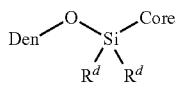   (2)

where each $R^d$ is independently an alkyl, alkoxy, or aryl;
a silazane of formula

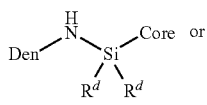   (1)

or

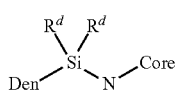   (2)

where each $R^d$ is independently an alkyl, alkoxy, or aryl;

a peroxide of formula

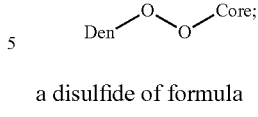

a disulfide of formula

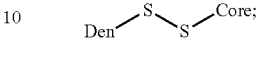

a boronic ester of formula

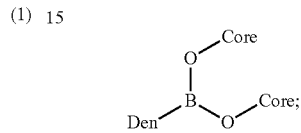

an acetal of formula

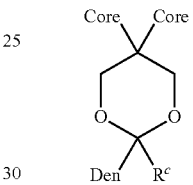

where $R^c$ is hydrogen, alkyl, aryl, or heterocyclic;
a di-substituted alkene of formula

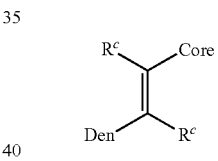

where $R^c$ is hydrogen, alkyl, aryl, or heterocyclic;
an imine of formula

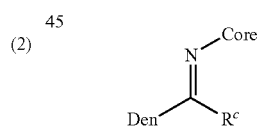

where $R^c$ is hydrogen, alkyl, aryl, or heterocyclic;
a photolytically labile ester such as, for example,

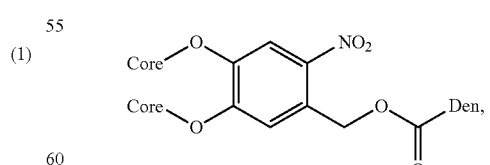   (1)

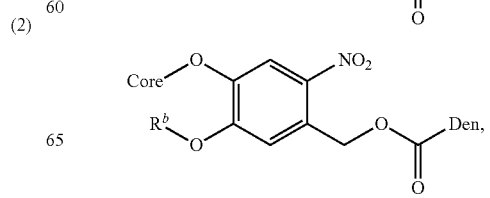   (2)

(3)

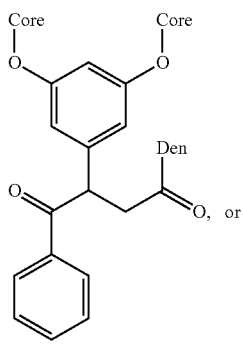

, or (4)

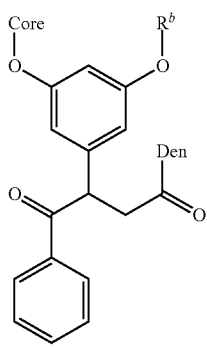

where $R^b$ is an alkyl;
or photolytically labile carbamates such as, for example, (1)

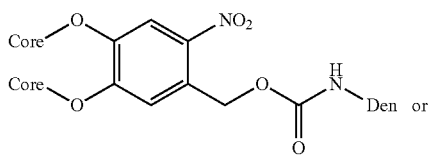

Den or (2)

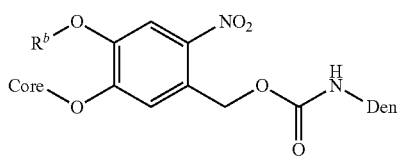

where $R^b$ is an alkyl.

As used herein, multiple structures for a type of Den-A-Core are designated with a number such as a (1) or (2). For example, using the designation numbers in the list above, carboxylate ester (1) refers to the structure

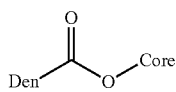

and carboxylate ester (2) refers to the structure

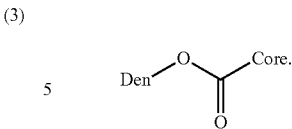

The recitation of two or more cores in a formula for the linkage Den-A-Core means that the dendron is covalently attached to the core at multiple locations. For example, a boronic ester, an acetal, some photolytically labile esters, and some photolytically labile carbamates are bonded to the core organic material in at least two locations.

The Den-A-Core linkages can be prepared by any known method. Some of these linkages can be formed by reaction of an electrophilic group (e.g., an activated ester) with a nucleophilic group such as a hydroxy group of an alcohol, an amino group of an amine, or a mercapto group of a mercaptan. The nucleophilic group can be either on the core organic material or on the dendron.

In some embodiments, Den-A-Core is a carboxylate ester. Various chemical approaches can be used to prepare such a linkage. For example, a dendron having a carboxy group (i.e., the dendron is a carboxylic acid) can be reacted with a hydroxy group on the core organic material (i.e., the core organic material is an alcohol) to form carboxylate ester (1).

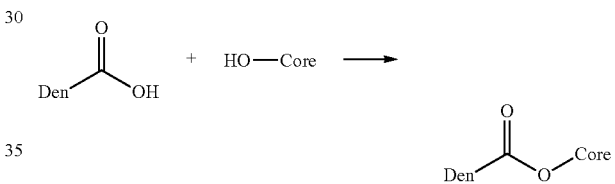

This reaction can occur in the presence of one or more reagents such as, for example, DCC and either DMAP or pyridine; DCC and DPTS; EDC and either DMAP or pyridine; DCC and HBT; DCC and PPY; or $PPh_3$ and either DEAD or DIAD. The term "DCC" refers to N,N'-dicyclohexylcarbodiimide. The term "DMAP" refers to 4-(dimethylamino)pyridine. The term "DPTS" refers to a 1:1 combination of DMAP and p-toluene sulfonic acid. The term "EDC" refers to N-(3-dimethylaminopropyl)-N'-ethylcarbodiimide hydrochloride. The term "HBT" refers to 1-hydroxy-1H-benzotriazole. The term "PPY" refers to 4-(pyrrolidin-1-yl)pyridine. The term "$PPh_3$" refers to triphenylphosphine. The term "DEAD" refers to diethyl azodicarboxylate. The term "DIAD" refers to diisopropyl azodicarboxylate.

Alternatively, a carboxylate ester (1) linkage can be formed by reacting the carboxy group on a dendron with thionyl chloride ($SOCl_2$) or oxalyl chloride ($COCl)_2$ in the presence of a base catalyst to form a dendron having a chlorocarbonyl group. The chlorocarbonyl group then can be reacted with a hydroxy group on the core organic material (i.e., the core organic material is an alcohol) in the presence of a reagent such as pyridine or DMAP.

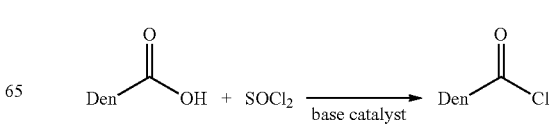

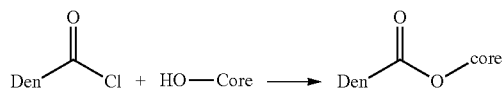

In other embodiments, Den-A-core is carboxylate ester (2). As with carboxylate ester (1), various chemical approaches can be used to prepare such a linkage. For example, a core organic material having a carboxy group (i.e., the core organic material is a carboxylic acid) can be reacted with a dendron having a hydroxy group (i.e., the dendron is an alcohol).

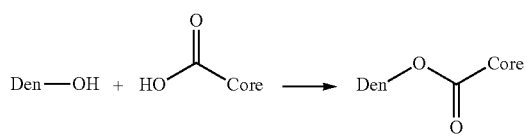

This reaction can be conducted in the presence of the same reagents that are suitable for preparing carboxylate ester (1). Alternatively, a carboxy group on the core organic material can be reacted with thionyl chloride or oxalyl chloride in the presence of a base catalyst to form a core organic material having a chlorocarbonyl group. The chlorocarbonyl group can be reacted with a hydroxy group on the dendron (i.e., the dendron is an alcohol) in the presence of a weak base such as pyridine or DMAP.

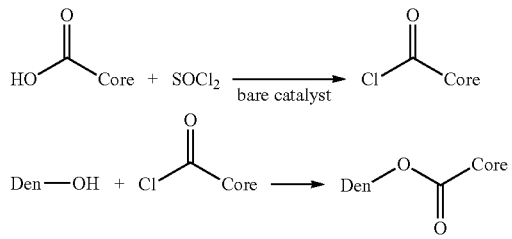

Amide linkages can be prepared using reactions similar to those used to prepare carboxylate esters. However, in the above reactions, a primary or secondary amine would be used in place of an alcohol as the nucleophile. More specifically, a dendron having a carboxy group (i.e., the dendron is a carboxylic acid) can be reacted with a core organic material having an amino group (i.e., the core organic material is an amine) to form amide (2).

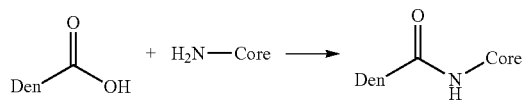

Alternatively, a dendron having an amino group (i.e., the dendron is an amine) can be reacted with a core organic material having a carboxy group (i.e., the core organic material is a carboxylic acid) to form amide (1).

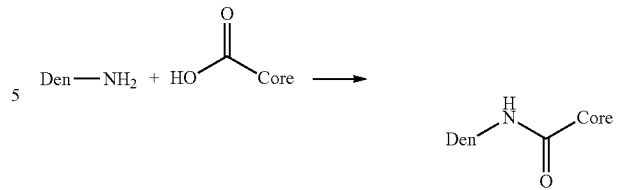

As with the carboxylate esters, the carboxy groups can be converted to chlorocarbonyl groups prior to reaction with an amine.

Thioester linkages can be prepared using similar reactions to those used to form carboxylate esters and amides. However, a mercaptan is used in place of an alcohol or amine as the nucleophile. More specifically, a dendron having a carboxy group (i.e., the dendron is a carboxylic acid) can be reacted with a core organic material having a mercapto group (i.e., the core organic material is a mercaptan) to form thioester (1).

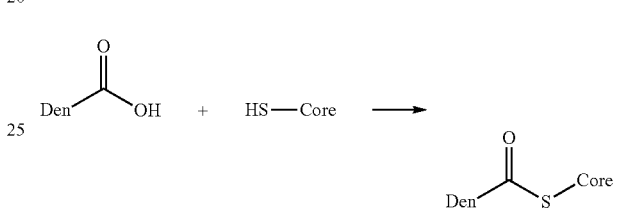

Alternatively, a dendron having a mercapto group (i.e., the dendron is a mercaptan) can be reacted with a core organic material having a carboxy group (i.e., the core organic material is a carboxylic acid) to form thioester (2).

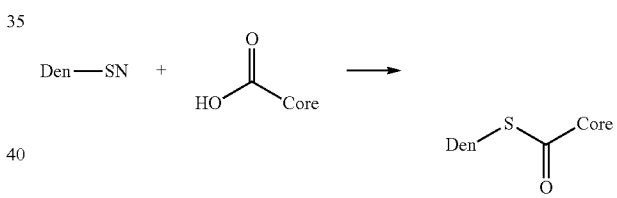

In yet other embodiments, the Den-A-Core linkage is an anhydride. Such a linkage can be formed by initially reacting a carboxy group on a dendron with thionyl chloride or oxalyl chloride in the presence of a base catalyst to form a dendron having a chlorocarbonyl group. The chlorocarbonyl group then can be reacted with a carboxy group on the core organic material in the presence of a weak base such as DMAP or pyridine.

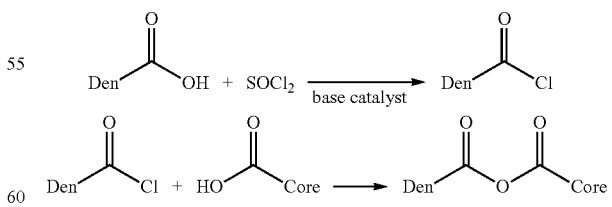

Alternatively, a carboxy group on the core organic material can be reacted with thionyl chloride or oxalyl chloride in the presence of a base catalyst to form a core organic material having a chlorocarbonyl group. The chlorocarbonyl group can be reacted with a carboxy group on the dendron to form an anhydride linkage.

Some other Den-A-Core linkages are siloxanes. Reacting a chlorosilyl group of a chlorosilane core organic material with a dendron that is an alcohol can form siloxane (2). The reaction is usually conducted in the presence of a base (e.g., triethylamine, imidazole, sodium hydroxide, or the like). Each $R^d$ group of the chlorosilyl group can be independently selected from an alkyl, aryl, or alkoxy group.

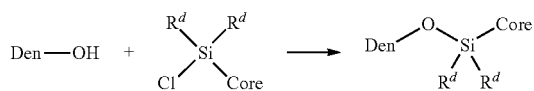

Alternatively, reacting a trifluoromethylsulfonatesilyl group of a trifluormethylsulfonate silane core organic material with a dendron having a hydroxy group can form a siloxane (2) linkage. The reaction is usually conducted in the presence of a base. Each $R^d$ group of the trifluoromethylsulfonatesilyl group can be independently selected from an alkyl, aryl, or alkoxy group.

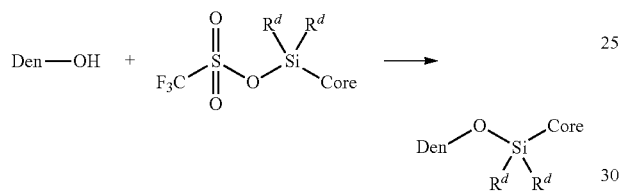

Similarly, reacting a chlorosilane or a trifluoromethylsulfonate silane dendron with a core organic material that is an alcohol can form siloxane (1).

Carbamate linkages can be formed, for example, by reacting an alcohol with an isocyanate. The isocyanato group can be on either the core organic material or the dendron as shown in the following reactions.

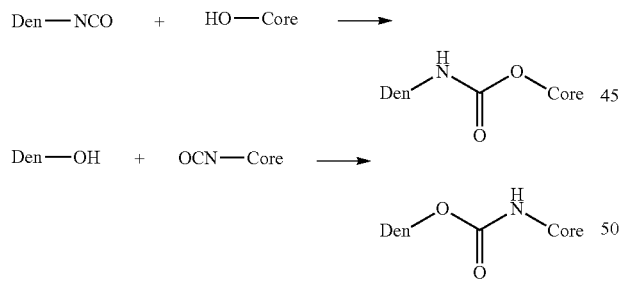

Thiocarbamate-5-ester linkages can be formed using similar reactions to those used to form carbamate linkages. Mercapto groups rather than hydroxy groups on the core or dendron can be reacted with an isocyanato group.

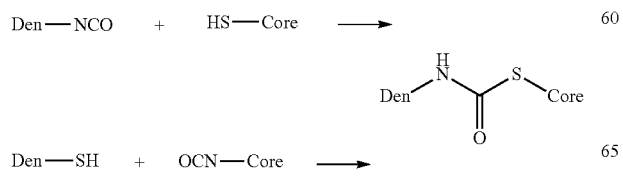

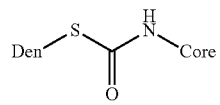

Either the core organic material or the dendron can be a mercaptan. These thiocarbamate-S-esters can be easier to cleave than carbamates and thiocarbamate-O-esters.

Sulfonamide linkages can be formed by reacting an amino group with a chlorosulfonyl group in the presence of a mild base such as DMAP or pyridine. Either the core organic material or the dendron can be an amine.

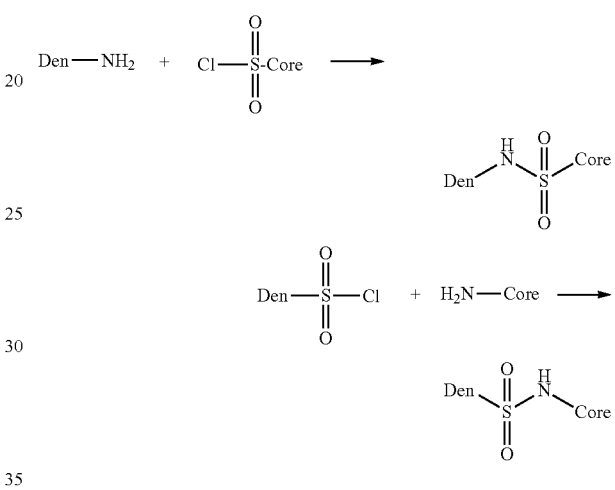

Phosphoramidate linkages can be formed by first reacting an alkyl dichlorophosphate (e.g., ethyldichlorophosphate) with an alcohol in the presence of a mild base such as pyridine or DMAP to form a chlorophosphono group. The chlorophosphono group can then be reacted with an amine. In some examples, the core organic material is an alcohol and the dendron is an amine.

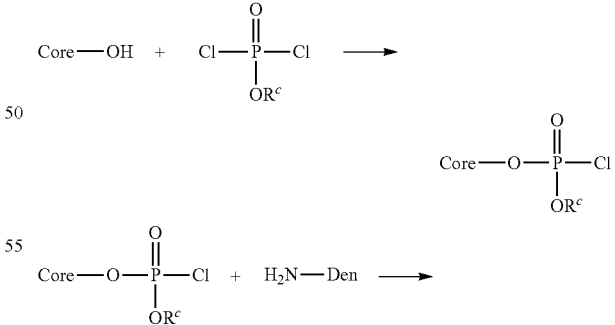

In other examples, the dendron is an alcohol and the amino group is on the core organic material.

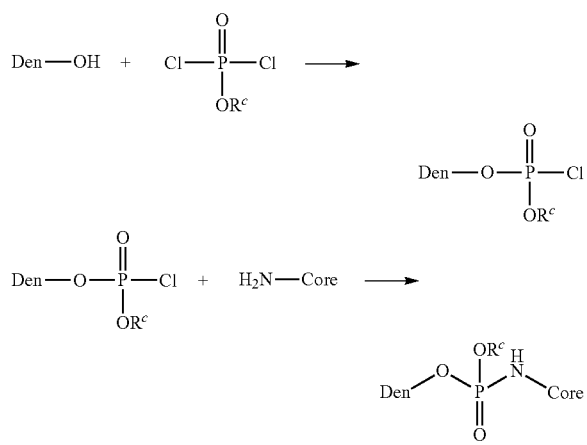

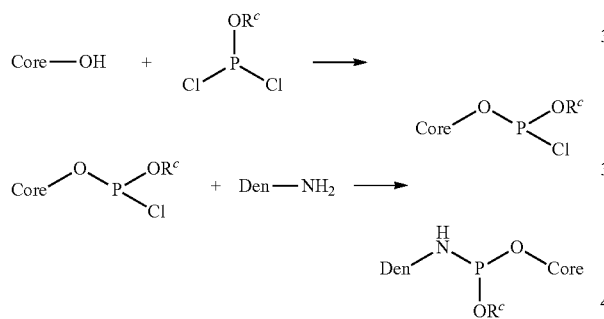

Phosphoramidite linkages can be formed by first reacting an alkyl dichlorophosphite (e.g., ethyldichlorophosphite) to produce a chlorophosphito group in the presence of a mild base such as pyridine or DMAP. The chlorophosphito group can be reacted with an amino group. In some examples, the amino group is on the dendron (i.e., the dendron is an amine and the core organic material is an alcohol).

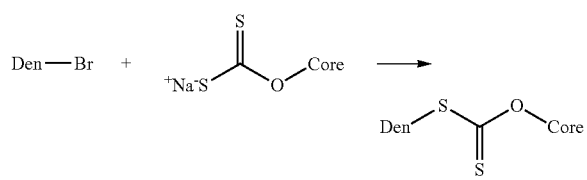

Alternatively, the amino group can be on the core organic material and the dendron is an alcohol that reacts with the alkyldichlorophosphite.

Dithiocarbonate (i.e., xanthate) linkages can be formed by reacting a halo group with a salt of a dithiocarbonic acid-O-ester. In some examples, the halo group is on the dendron.

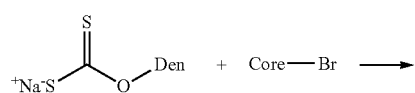

In other examples, the halo group is on the core organic material.

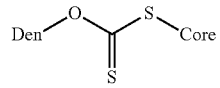

A phosphonate linkage can be formed by reacting a hydroxy group and a phosphono group using Mitsunobu esterification conditions (e.g., in the presence of $PPh_3$ and either DEAD or DIAD). In some examples, the hydroxy group is on the dendron (i.e., the dendron is an alcohol and the core organic material is a phosphonate).

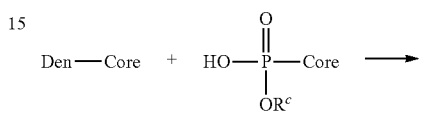

In other examples, the hydroxy group is on the core organic material (i.e., the core organic material is an alcohol and the dendron is a phosphonate).

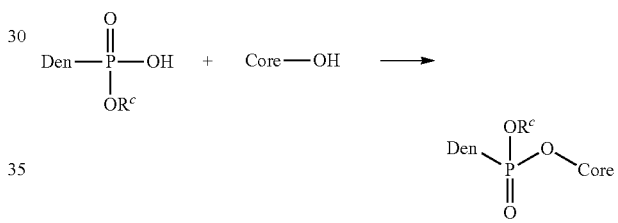

Boronic ester linkages can be formed by reacting a boronic acid with a core organic material having at least two hydroxy groups. The boronic ester includes two covalent bonds to the core organic material. That is, the boronic ester is attached to the core in two places.

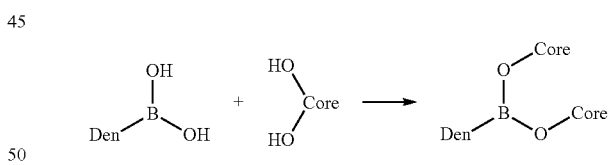

After attachment of the dendron to the core organic material, the dendrons are crosslinked to form a crosslinked dendrimer. Each dendron has at least two crosslinkable groups that can be used to crosslink one dendron to at least one other dendron. Each dendron is crosslinked to one or two other dendrons. When the dendrimer is prepared from two dendrons, there are two crosslinks between the first dendron and the second dendron. When the dendrimer is prepared from three or more dendrons, a first dendron can be crosslinked to a second dendron and to a third dendron. That is, when there are three or more dendrons in a dendrimer, each dendron is crosslinked to two other dendrons.

A first dendron has at least two first crosslinkable groups and a second dendron has at least two second crosslinkable groups. To form a crosslinked dendrimer, the first crosslinkable groups and the second crosslinkable groups are reacted.

The first and second crosslinkable groups can be reacted with each other or with other crosslinkable groups. In some examples, such as in dendrimers that are formed from only two dendrons, two of the first crosslinkable groups are crosslinked with two of the second crosslinkable groups. In some other examples, such as in dendrimers that are formed from at least three dendrons, one of the first crosslinkable groups on the first dendron is crosslinked with one of the second crosslinkable groups on the second dendron, one of the first crosslinkable groups on the first dendron is reacted with a crosslinkable group on the third dendron, and one of the second crosslinkable groups on the second dendron is reacted with a crosslinkable on a third dendron. This example is shown in Reaction Scheme A.

Additionally, a molecular chain of one dendron can be crosslinked to another molecular chain of the same dendron. Some dendrons have two, three, four, five, six, seven, eight, nine, ten, or more than ten crosslinkable groups. Within a dendron, the crosslinkable group can be located along the length of a molecular chain or at an outermost periphery of a molecular chain (e.g., as shown in Reaction Scheme A). In some embodiments, a dendron has a crosslinkable group at the outermost periphery of each outer molecular chain (i.e., at the end of each outer branch of the dendron as shown in Reaction Scheme A).

The crosslinkable groups can be reacted to form reversible or irreversible crosslinks. The crosslink density is sufficiently high to prevent the disassembly of the dendritic structure upon removal of the core organic material. That is, the crosslinks allow the crosslinked dendrimer to remain intact even after removal of the central core organic material in the process of forming a cored dendrimer. On the other hand, the crosslink density is sufficiently low to allow subsequent removal of the core organic material without disrupting the crosslinks. Additionally, the crosslink density is sufficiently low to allow a metal-containing precursor and other reagents to enter into the cored dendrimer.

In one method of forming the crosslinks, a first crosslinkable group reacts directly with a second crosslinkable group. In another method of forming the crosslinks, a difunctional crosslinking compound is reacted with both the first crosslinkable group and the second crosslinkable group.

In the following formulas, $Den_1$ denotes the first dendron exclusive of one of the first crosslinkable groups while $Den_2$ denotes the second dendron exclusive of one of the second crosslinkable groups. Each $Den_1$ and $Den_2$ is also attached to the core organic material. For ease of describing the crosslinking reactions, the core organic material is not included in the reactions. Each $Den_1$ and $Den_2$ includes at least one other crosslinkable group. For ease of describing the crosslinking reactions, only one crosslinkable group is included in the reactions.

Various chemical approaches can be used to form a crosslink by directly reacting a first crosslinkable group with a second crosslinkable group. In a first example, a metathesis catalyst can be added to crosslink two alkene groups as shown in the following reaction.

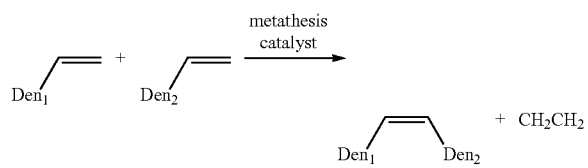

Exemplary metathesis catalysts include, but are not limited to, ruthenium, molybdenum, tungsten, or rhenium complexes. The alkenes are often monofunctional. Replacing a hydrogen atom on the alkenyl group tends to decrease the rate of the crosslinking reaction.

Another example of directly reacting the crosslinkable groups involves a [2+2] cycloaddition reaction in the presence of light.

The reactants can be stilbenes (e.g., $Z_1$ and $Z_2$ are phenyl), cinnamates (e.g., $Z_1$ and $Z_2$ are carboxy or carboxylate groups), or uracils. In a more specific example, the reactants are uracils such as described further in Tominaga et al., *Chemistry Letters*, 374-375 (2000).

Additionally, the crosslinkable groups can be directly reacted using typical polymerization reactions. For example, acrylates, methacrylates, acrylamides, and methacrylamides can be crosslinked in the presence of a thermal of photo initiator.

In this reaction, $Z_1$ and $Z_2$ are each independently hydrogen or methyl; $Y_1$ and $Y_2$ are each independently oxygen or $NR^c$ where $R^c$ is hydrogen, alkyl, aryl, or heterocyclic; and n is an integer of 1 to 100. In other polymerization crosslinking reactions, vinyl ethers or vinyl esters can undergo a cationic polymerization reaction as shown below where n is an integer of 1 to 100.

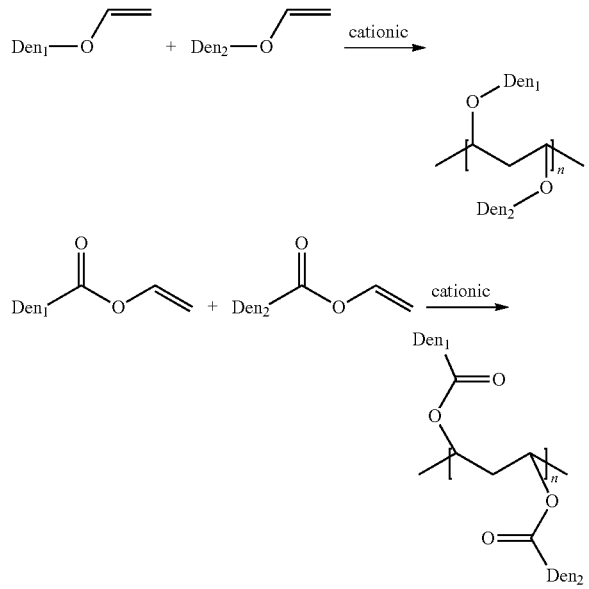

In yet other polymerization crosslinking reactions, epoxides can undergo ring-opening polymerization reactions in the presence of an acid or amine catalyst where n is an integer of 1 to 100.

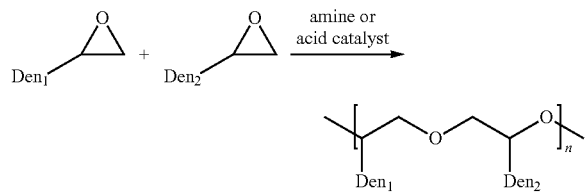

Another method of crosslinking dendrons involves the formation of a coordination crosslink with a metal species. Both the first and second crosslinkable groups ligate to a single metal species. For example, phenanthrenyl groups can form a coordination crosslink in the presence of a metal salt (M) such as a copper salt.

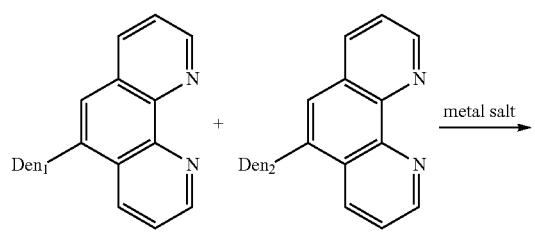

-continued

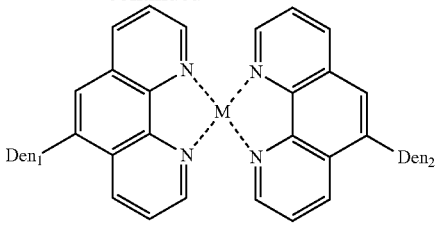

As another example of a direct reaction, each crosslinkable group can be a cyclobutylphenyl group. Upon heating, two such groups can form a tricyclic structure as depicted in the following reaction.

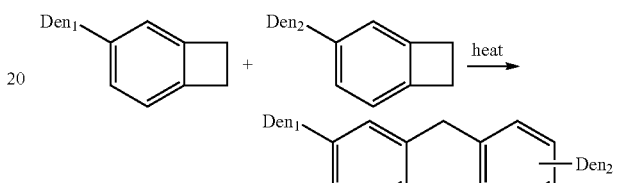

In the above crosslinking reactions, a first dendron is crosslinked to a second dendron. The first dendron and the second dendron are often part of the same dendritic structure (i.e., the dendrons that are crosslinked are attached to the same core organic material). However, in some examples, the dendrons that are crosslinked are in different dendritic structures (i.e., the dendrons that are crosslinked are not attached to the same core organic material). When it is desired that the crosslinking is between dendrons attached to the same core organic material, the crosslinking reactions often occur in a medium with a relatively low amount of the dendrimer to minimize the interactions between different dendritic structures.

In the second method of forming a crosslinked dendrimer, various multifunctional (e.g., difunctional) crosslinking agents can be used to join two dendrons. The crosslinking agent can react with both the first crosslinkable group and the second crosslinkable group. In some embodiments, the crosslinking agent is a nucleophile and the crosslinkable groups are electrophiles. Alternatively, the crosslinking agent is an electrophile and the crosslinkable groups are nucleophiles. Suitable crosslinking agents include difunctional activated carbonyls, difunctional azlactones, difunctional isocyanates, difunctional silanes, difunctional siloxanes, difunctional alkylhalides, difunctional arylhalides, difunctional aldehydes, difunctional ketones, difunctional aryl cupric halides, difunctional (meth)acrylates, difunctional (meth)acrylamides, difunctional alcohols, difunctional amines, difunctional compounds having hydroxy and amino groups, difunctional compounds having hydroxy and mercapto groups, difunctional compounds having mercapto and amino groups, difunctional alkylenes, difunctional conjugated dienes, difunctional β-ketones, difunctional β-keto esters, difunctional β-keto amides, and the like. The term "difunctional" refers to two functional groups of the type characteristic of the named compound. For example, a difunctional amine has two amino groups and a difunctional isocyanate has two isocyanato groups.

In some examples, the crosslinking agent is a difunctional carboxylic acid, or a difunctional, activated carbonyl such as a difunctional carboxylic acid halide, difunctional anhydride, or difunctional succinimide ester. Such a crosslinking agent can be reacted with hydroxy crosslinkable groups, amino crosslinkable groups, or mercapto crosslinkable groups on dendrons as exemplified by the following reactions.

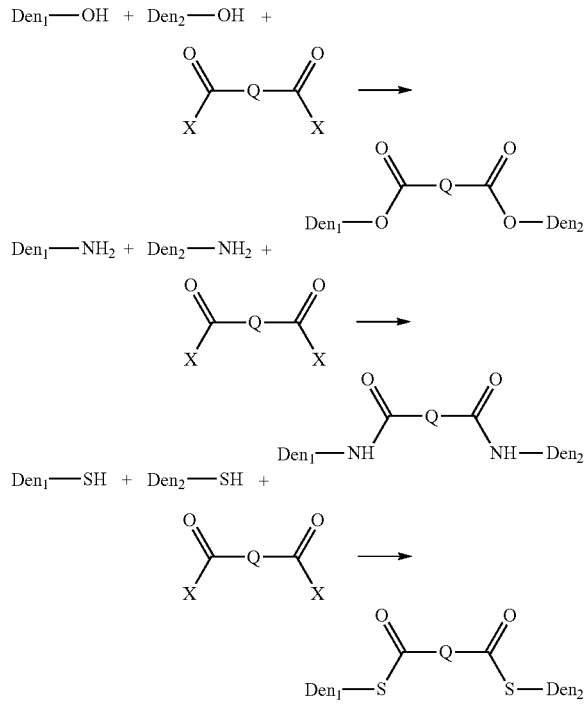

In these reactions, X is independently selected from chloro, bromo, hydroxy, acyloxy, or oxysuccinyl; and Q is a connecting group that is aliphatic, aromatic, heterocyclic, or a combination thereof. Although the crosslinkable groups shown in these equations are the same, the crosslinkable groups can be different (i.e., each crosslinkable group can be independently selected from an amino, hydroxy, and mercapto groups). Alternatively, the crosslinking agent can have two functional groups independently selected from amino, mercapto, and hydroxy groups with crosslinkable groups selected from halocarbonyl, carboxy, acyloxycarbonyl, or succinyloxycarbonyl groups.

In other examples, the crosslinking agent is a difunctional azlactone. Such a crosslinker could be reacted with amino crosslinkable groups or hydroxy crosslinkable groups as exemplified by the following reactions.

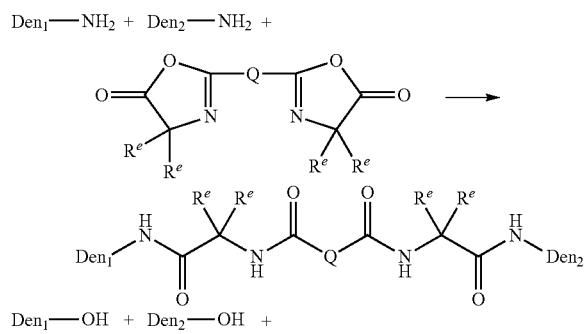

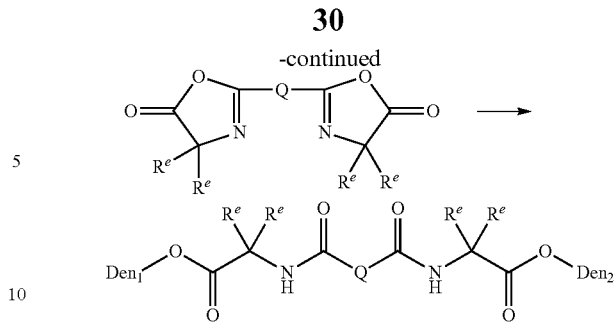

Each $R^e$ group is independently hydrogen, alkyl, or aryl; and Q is a connecting group that is aromatic, aliphatic, heterocyclic, or a combination thereof. Although the crosslinkable groups shown in these equations are the same, one crosslinkable group can be a hydroxy and the other crosslinkable group can be an amino. Alternatively, the dendrons can be azlactones and the crosslinking agent can have two functional groups independently selected from an amino and hydroxy groups. In both types of examples, the crosslinked reaction product is an ester or amide.

In still other examples, the crosslinking agent is a difunctional isocyanate and the crosslinkable groups are amino groups or hydroxy groups.

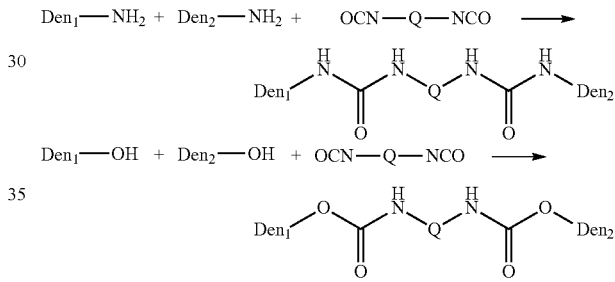

In these reactions, Q is a connecting group that is aromatic, aliphatic, heterocyclic, or a combination thereof. Although the crosslinkable groups shown in these equations are the same, one crosslinkable group can be a hydroxy and the other crosslinkable group can be an amino. Alternatively, the crosslinkable groups can be isocyanato groups and the crosslinking agent can have two functional groups independently selected from hydroxy and amino groups. In both types of examples, the crosslinked reaction product is a urea or urethane.

A difunctional silyl-containing crosslinking agent can be reacted with alkenyl groups in the presence of a palladium catalyst.

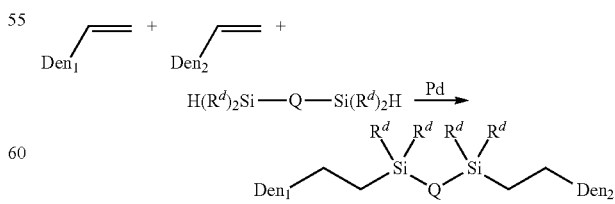

In this reaction, each $R^d$ is independently an alkyl, aryl, or alkoxy group; and Q is a connecting group that is aromatic, aliphatic, heterocyclic, or a combination thereof. Alternatively, the crosslinking agent can be a difunctional alkene (i.e., two carbon-carbon double bonds) and the crosslinkable groups can be silyl groups of formula —Si($R^d$)$_2$H where $R^d$ is the same as defined above. In both of these examples, the crosslinked reaction product is a silane.

A dihalogenated alkane crosslinking agent can be reacted with hydroxy, amino, or mercapto groups as exemplified in the following reaction where the crosslinkable group is a hydroxy.

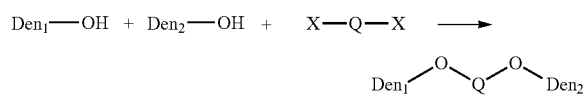

In this reaction, each X is independently bromo, chloro, fluoro, or iodo; and Q is a connecting group that is aromatic, aliphatic, heterocyclic, or a combination thereof. Although both dendrons in this reaction have the same crosslinkable group, each crosslinkable group can be independently selected from hydroxy, amino, or mercapto groups. In complementary examples, the crosslinking agent has two functional groups independently selected from amino, mercapto, and hydroxy groups and each crosslinkable group is a haloalkyl.

A difunctional aldehyde or difunctional ketone crosslinking agent can be reacted with amino groups to form an imine as shown in the following reaction where each $R^c$ is independently hydrogen, alkyl, aryl, or heterocycle and Q is a connecting group that is aromatic, aliphatic, heterocyclic, or a combination thereof

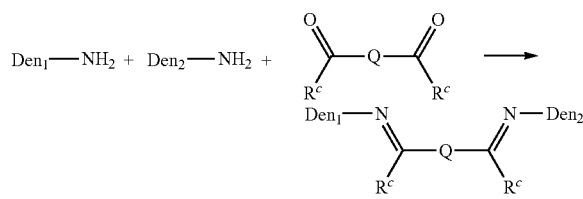

In complementary examples, the crosslinking agent is a difunctional amine and the crosslinkable groups are independently selected from formyl or acyl groups.

Aryl halide crosslinkable groups can react with a difunctional aryl halide that has been treated with copper to produce a difunctional aryl cupric halide crosslinking agent using an Ullman reaction. In this reaction, X is halo and Q is a connecting group that is aromatic, aliphatic, heterocyclic, or a combination thereof

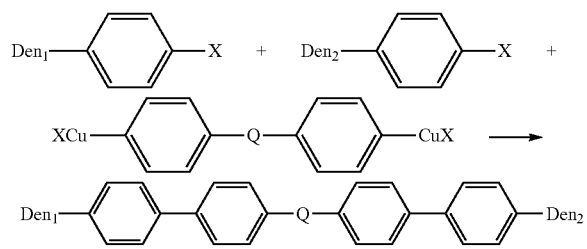

Crosslinks can also be formed using Michael addition reactions. In a first example, the crosslinkable groups can be amino, hydroxy, or mercapto groups and the crosslinking agent can be a difunctional (meth)acrylate (i.e., difunctional acrylate or difunctional methacrylate) or difunctional (meth)acrylamide (i.e., difunctional acrylamide or difunctional methacrylamide). Such a reaction is shown in the following reaction for amino crosslinkable groups and a difunctional acrylamide crosslinking agent.

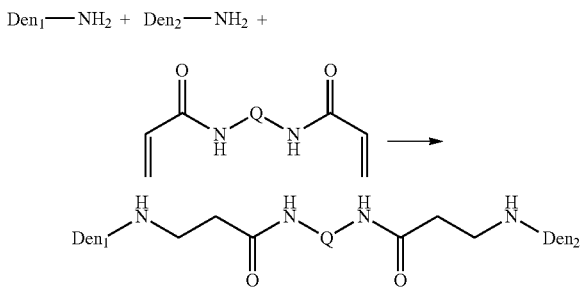

In a second example, the crosslinkable group can be a β-diketone, β-diketo ester, or β-diketo amide and the crosslinking agent can be a difunctional (meth)acrylate or a difunctional (meth)arylamide. Such a reaction is shown in the following reaction for a difunctional acrylamide crosslinking agent and a β-diketone.

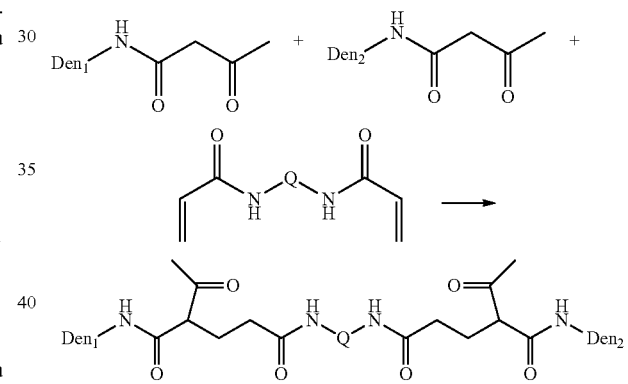

In these reactions, Q is a connecting group selected from an aromatic group, aliphatic group, heterocycle group, or a combination thereof.

A crosslink can be formed using a Diels-Alder reaction. That is, two crosslinkable groups that are dienes can react with a crosslinking agent that is a difunctional dienophile (i.e., there are two carbon-carbon double bonds). An example is shown in the following reaction.

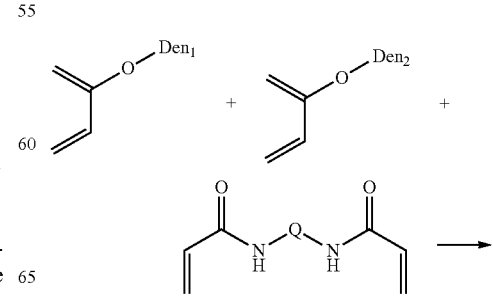

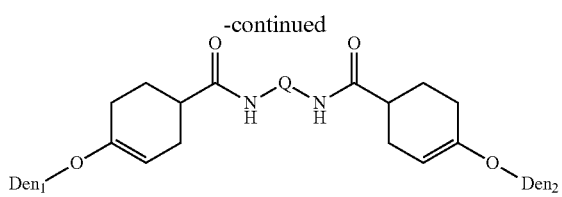

In this reaction, Q is a connecting group selected from an aromatic group, aliphatic group, heterocycle group, or a combination thereof.

After formation of the crosslinked dendrimer, the attachment groups linking the dendrons to the core organic material are chemically cleaved. The core organic material or a derivative of the core organic material is removed from the crosslinked dendrimer. The structure remaining after removal of the core organic material or the derivative of the core organic material is the cored dendrimer. The cored dendrimer is a crosslinked polymeric material (e.g., a crosslinked polymeric sphere) that is at least partially hollow in the central, internal region. The cored dendrimer has interior end groups that are capable of binding (i.e., forming a bond or non-covalent interaction such as a coordinative bond, ionic bond, hydrogen bond or interaction through van der Waals forces) with a metal-containing precursor such as, for example, a metal, salt (e.g., the metal-containing precursor contains a metal oxoanion, metal salt, metal hydrous oxide, or organometallic complex. The metal oxoanion can be in the form of a salt, acid, or acid salt.

The core organic material can typically be freed from the crosslinked dendrimer after cleavage of the attachment group. In some examples, however, the core organic material is further degraded such as through hydrolysis or reduction reactions to allow more facile passage of the core organic material from the interior of the crosslinked dendrimer. After removal of the core organic material from the crosslinked dendrimer to form a cored dendrimer, additional regions of the dendrons within the interior of the cored dendrimer can be removed and/or further modified such as through hydrolysis or reduction reactions. The removal of the core organic material corresponds to the removal of the zero generation of the dendrimer. Additional generations also can be removed such as, for example, the first generation or the first generation plus the second generation from higher generation dendritic structures.

The cored dendrimer remains intact after removal of the core organic material due, at least in part, to the existence of the crosslinks of one dendron to another dendron, the existence of crosslinks between the molecular chains of a single dendron, or combinations thereof. The organic material removed from the crosslinked dendrimer that results in the formation of a cored dendrimer typically does not involve the removal of the crosslinks between dendrons or between molecular chains of a dendron. At least one generation of the original dendrons used to form the dendritic structure remain in the cored dendrimer.

The lowest generation of the dendritic structure that remains after removal of the core organic material or a derivative thereof has reactive groups that are referred to as the interior end groups of the cored dendrimer or end groups within the interior of the cored dendrimer. The end groups within the interior of the cored dendrimer are often a carboxy, hydroxy, amino, mercapto, sulfono, sulfamino, phosphono, phosphonamino, phosphate, borono, silanol, formyl, or acyl group. There are at least two end groups within the interior of the cored dendrimer and these end groups can be the same or different.

In some embodiments, cleavage of the attachment group and removal of the core organic material or a derivative thereof results in the formation of a carboxy group as an end group of a cleaved dendron within the interior of the cored dendrimer. The cleaved dendron refers to the generations of the dendron that remain after chemical cleavage of the attachment group. The cleaved dendron is of formula

where D represents the region of the dendron exclusive of the interior end group that remains in the central region of the cored dendrimer. Carboxy end groups within the interior of a cored dendrimer can be formed under mild hydrolytic conditions from a Den-A-Core linkage such as carboxylate ester (1), an anhydride, a succinimide ester, thioester (1), or mixed anhydride (1) of carboxylic acid and sulfonic acid. The carboxy end groups can also be formed under strong acid or strong base conditions from amide (2). Additionally, a carboxy end group within the interior of the cored dendrimer can be formed from photolytically labile ester linkages by exposure to suitable actinic radiation.

In other embodiments, cleavage of the attachment group results in the formation of a hydroxy group as the end group of a cleaved dendron within the interior of the cored dendrimer. That is, the cleaved dendron is of formula

D-OH where D represents the region of the dendron exclusive of the interior end group that remains in the central region of the cored dendrimer. Hydroxy end groups can be formed, for example, by exposing sulfonate (1), phosphonate (1), phosphate, carbonate, sulfamide (1), phosphoramidate (1), carboxylate ester (2), or siloxane (2) to mild hydrolysis conditions. Siloxane (2) can also be cleaved with fluoride salts such as tetrabutyl ammonium fluoride. Hydrolyzing carbamate (1), dithiocarbamate-O-ester (2), or thiocarbamate-O-ester (2) in the presence of a strong base can generate a hydroxy end group. Additionally, a peroxide can generate a hydroxy end group when exposed to heat or to a radical source.

In other embodiments, cleavage of the attachment group results in the formation of an amino group as the end group of the cleaved dendron within the interior of the cored dendrimer. That is, the cleaved dendron is of formula

D-NH$_2$ where D represents the region of the dendron exclusive of the interior end group that remains in the central region of the cored dendrimer. Amino end groups can be formed in the interior of the dendrimer by hydrolysis (e.g., under relatively strong conditions) or by reduction (e.g., using reagents such as NaBH$_4$, LiAlH$_4$, or the like) of amide (1), thioamide, carbamate (2), thiocarbamate-O-ester (1), dithiocarbamate (1), thiocarbamate-S-ester (1), sulfonamide (1), sulfamide (2), or silazane (1). Phosphoramidite (1) and phosphoramidate (2) can be cleaved by alcohols or water under mild conditions. Additionally, amino end groups can be formed by photolytically labile carbamates. Amino end groups can also be formed by cleaving an ester with hydrazine.

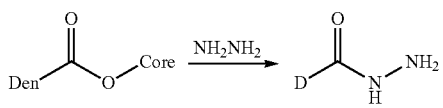

In still other embodiments, cleavage of the attachment group can result in the formation of a mercapto group as the end group of the cleaved dendron within the interior of the cored dendrimer. That is, the cleaved dendron can be of formula

D-SH where D represents the region of the dendron exclusive of the interior end group that remains in the central region of the cored dendrimer. Mercapto end groups can be formed from, for example, thioesters (2), dithioesters, thiophosphonates, thiophosphonamides, and dithiocarbonates (1) by cleaving the attachment group under mild to strong hydrolysis conditions. Thiocarbamates-5-esters (2) and dithiocarbamates (2) can be cleaved using strong hydrolysis conditions or mild reduction conditions similar to those used to generate amino end groups. Disulfides can be cleaved using reduction conditions to provide mercapto end groups.

Additionally, cleavage of the attachment group can result in the formation of a sulfono group as the end group of the cleaved dendron in the interior of the cored dendrimer. That is, the cleaved dendron is of formula

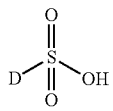

where D represents the region of the dendron exclusive of the interior end group that remains in the central region of the cored dendrimer. These end groups can be formed from sulfonate (2) and mixed anhydride (2) under mild hydrolysis conditions. Mild hydrolysis conditions also can be used to form sulfamino end groups

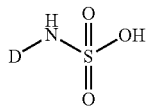

from sulfamides (2).

Cleavage of the attachment group can result in the formation of a phosphono group as the end group of the cleaved dendron in the interior of the cleaved dendrimer. That is, the cleaved dendron is of formula

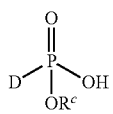

where D represents the region of the dendron exclusive of the interior end group that remains in the central region of the cored dendrimer and $R^c$ is a hydrogen, alkyl, aryl, or heterocycle. The phosphono group can be formed from phosphonates (2) using mild hydrolysis conditions. Mild hydrolysis conditions can also be used to form phosphonamino end groups

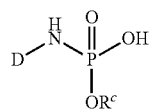

from phosphoramidates (2) or form phosphate end groups

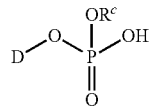

from phosphormidites (2).

End groups within the interior of a cored dendrimer can be a borono

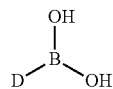

generated by hydrolysis of the corresponding boronic ester in water. D represents the region of the dendron exclusive of the interior end group that remains in the central region of the cored dendrimer.

Additionally, silanols

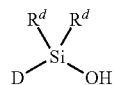

can be formed where D represents the region of the dendron exclusive of the interior end group that remains in the central region of the cored dendrimer and each $R^d$ is independently an alkyl, aryl, or alkoxy. Silanols can be generated by hydrolysis of the corresponding siloxanes (1) in water or by cleavage with tetrabutylammonium fluoride. Additionally, silanols can be formed from silazanes (2) with a strong base.

The end groups of dendrons within the interior of the cored dendrimer can be an acyl or formyl group

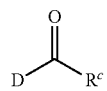

where $R^c$ is hydrogen, alkyl, aryl, or heterocycle and D represents the region of the dendron exclusive of the interior end group that remains in the central region of the cored dendrimer. Various chemistries can be used to generate an acyl or formyl end group. For example, imines can be hydrolyzed using mild conditions. Additionally, acetals can be cleaved with a dilute acid (e.g., dilute hydrochloric acid) in a solvent such as acetone. Further, a cis- or trans-disubstituted alkene can be subjected to oxidative conditions (e.g., ozonolysis or various oxidizing agents such as sodium iodinate, etc.).

Post-cleavage modification reactions can be used to provide end groups for the dendrons within the cored dendrimer that are capable of attracting a metal-containing precursor. For example, an activated ester can be treated with ammonia or ammonium hydroxide to generate an amide. The subsequently formed amide can be subjected to reduction conditions (e.g., NaBH$_4$) to form an amine.

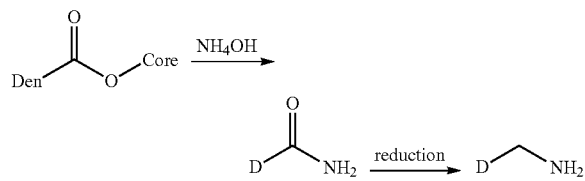

In another example of a post-cleavage modification reaction, an ester can be hydrolyzed to an alcohol.

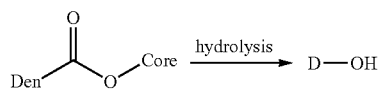

The subsequently formed alcohol can be reacted with an acid chloride (e.g., acetoacetic acid chloride) to provide other functionality such as, for example, an acetoacetyl group).

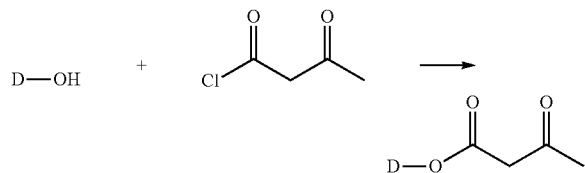

An alcohol can also be reacted with PCl$_3$ or P$_2$O$_5$ to produce a phosphate.

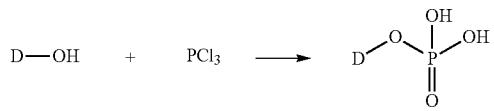

The interior end groups within the cored dendrimer are capable of forming a bond with a metal-containing precursor. That is, the interior end group is reacted with a metal-containing precursor to form of bound metal-containing precursor. The bound metal-containing precursor is attached to the cored dendrimer within the central region of the cored dendrimer. The metal-containing precursor is bound by the formation of a coordinative bond, an ionic bond, an hydrogen bond or interaction through van der Waals forces. Suitable metal-containing precursors include, but are not limited to, a metal oxoanion, metal salt, metal hydrous oxide, or organometallic complex. The metal oxoanion can be in the form of a salt, acid, or acid salt. In some embodiments, the pH is adjusted to convert the interior end group to an ionic form. For example, the pH can be raised to form the corresponding ionic base of an acid end group, and the pH can be lowered to form the corresponding ionic acid of a base end group. The metal-containing precursor can be subsequently reacted to form a metal oxide particle within the cored dendrimer. That is, the cored dendrimer functions as a template for the preparation of metal oxide particles. The metal oxide particle forms within the cored dendrimer in the central interior region that is free of organic material.

In some embodiments, only the interior end groups formed after removal of the core organic material or a derivative thereof are capable of binding (i.e., either forming a bond such as a coordinative bond or ionic bond, or forming a non-covalent interaction such as a hydrogen bond or interaction through van der Waals forces) with a metal-containing precursor. The cored dendrimer tends to be free of other groups that can bind with the metal-containing precursor.

The metal-containing precursor includes a chemical species or compound that can either form a bond such as a coordinative bond or an ionic bond with the interior end groups of the cored dendrimer, or be held within the dendrimer interior by non-covalent forces such as a hydrogen bond or interaction through van der Waals forces. Mixtures of metal-containing precursors can be used to prepare alloys that contain various metal oxides. After forming a bond with an interior end group within the cored dendrimer, the metal-containing precursor is treated with a reactive agent to form a metal oxide particle within the central interior region of the cored dendrimer.

Some exemplary metal oxide particles are transition metal oxides such as, for example, tin oxide, titanium oxide, iron oxide, or zinc oxide. Other exemplary metal oxides include non-transition metal oxides such as, for example, aluminum oxide. Suitable metal-containing precursors for these metal oxides include, for example, metal oxoanions in the form of salts, acids, or acid salts that can be dissolved in water or a polar solvent such as, for example, Na$_2$SnO$_3$, K$_2$SnO$_3$, NaAlO$_2$, KAlO$_2$, and the like. Other suitable metal-containing precursors include, for example, metal salts such as, for example, (NH$_4$)$_2$Fe(SO$_4$), TiCl$_4$, Zn(NO$_3$) or SnCl$_2$; and organometallic complexes such as, for example, Fe(CO)$_5$.

The soluble metal-containing precursor can form a coordinative bond, ionic bond, hydrogen bond, or interaction through van der Waals forces with an interior end group within the central interior region of the cored dendrimer. The bound metal-containing precursor can be converted to a metal oxide by exposure to a reagent such as carbon dioxide or trimethylamine oxide. In some cases, reaction of the bound metal-containing precursors with water results in the formation of a metal oxide particle. In other cases, reaction of the bound metal-containing precursors with bases, such as tetramethylammonium hydroxide, sodium hydroxide, or lithium hydroxide, results in the formation of a metal oxide particle.

The reactions to bind the metal-containing precursor to the interior group of the cored dendrimer and to convert the bound metal-containing precursor to a metal oxide are typically conducted in water, a polar solvent, or a solvent mixture such as a biphasic system. The reactions often occur at room temperature (e.g., 20 to 25° C.) or at a temperature up to about 100° C.

In some embodiments, the cored dendrimer can be removed after the formation of the metal oxide particles. The cored dendrimer can be dissolved, for example, in an organic solvent that does not dissolve the metal oxide particles.

In a second aspect, a composite particle is provided that includes a metal oxide particle within a central interior region of a cored dendrimer. The cored dendrimer has crosslinked dendrons surrounding the central interior region and the central interior region is free of organic material.

The cored dendrimers of the composite particles are crosslinked polymeric spheres that are free of organic material in the central region of the sphere. The cored dendrimer is formed by removing an interior region of a crosslinked dendrimer after cleavage of the attachment groups between the core organic material in the central region and the dendrons. The cored dendrimers contain $n^{th}$ generation material (i.e., n is an integer of 2 to 20) with at least some of the lower generations of material removed. For example, some cored dendrimers can have the zero generation removed, the zero and first generation removed, or the zero, first, and second generations removed.

The cored dendrimer contains a plurality of crosslinks between the dendrons and optionally between the individual molecular chains within a dendron. The crosslinking of the individual outer molecular chains tends to produce a cored dendrimer that is robust. The crosslink density tends to be low enough for passage of metal-containing precursors and other reactants used to form the metal oxide particles into the interior of the cored dendrimer.

In some embodiments, the growth of the metal oxide particles within the cored dendrimer is limited by the location of the crosslinks. The crosslinks tend to hinder the further growth of the metal oxide particles. The metal oxide particles can have dimensions corresponding to the cored dendrimer where the crosslinks are at the outer periphery of the dendron molecular chains. That is, the size of the cored dendrimer often defines the maximum size of the metal oxide particles. When the cored dendrimer has crosslinks at locations other than at the periphery of the dendron molecular chains (i.e., the crosslinks are along the length of the branches within the dendron), the location of the crosslinks tends to define the maximum size of the metal oxide particles formed within the cored dendrimer. In some embodiments, the metal oxide particles have a size that is larger than the central region of the cored dendrimer that is free of organic material.

In other embodiments, metal oxide particles may be prepared of a size that is greater than the size of a single cored dendrimer. That is, the metal oxide particle has a size that is greater than an outer dimension of the cored dendrimer. In this embodiment, the inorganic particle may be associated with more than one cored dendrimer. That is, the metal oxide particle can form a composite with more than one cored dendrimer.

The mean average particle size is typically less than 100 nanometers. In some embodiments, the mean average particle size is less than 80 nanometers, less then 60 nanometers, less than 50 nanometers, less than 40 nanometers, less than 30 nanometers, less than 20 nanometers, or less than 10 nanometers. The mean average size is usually no less than 0.1 nanometers, no less than 0.2 nanometers, no less than 0.5 nanometers, no less than 1 nanometer, or no less than 2 nanometers. For example, the mean average particle size can be in the range of 0.1 to 100 nanometers, in the range of 0.5 to 50 nanometers, in the range of 0.5 to 40 nanometers, in the range of 0.5 to 30 nanometers, in the range of 0.5 to 20 nanometers, or in the range of 0.5 to 10 nanometers.

In some embodiments, the composite particle is free of covalent bonds or ionic bonds between an outer surface of the metal oxide particle and the cored dendrimer. That is, the cored dendrimer does not have groups along the length of the molecular chains of the dendrons or at the outer periphery of the molecular chains of the dendrons that can form a coordinative bond or an ionic bond with a metal-containing precursor or metal oxide particle. The only groups capable of forming such a bond with a metal-containing precursor, metal oxide particle, or both are the interior end groups.

The lack of additional groups capable of bonding with a metal-containing precursor, metal oxide particle, or a combination thereof results in the formation of metal oxide particles that have an outer surface that is non-passivated and that is not bonded to the cored dendrimer. This can be advantageous for applications such as catalysis where coordinated metal oxide surfaces tend to be less reactive than metal oxide surfaces that are not coordinated.

In a third aspect, a composition is provided that includes an organic matrix and a composite particle in the organic matrix. The composite particle contains a metal oxide particle within a central interior region of a cored dendrimer. The cored dendrimer has crosslinked dendrons surrounding the central interior region and the central interior region is free of organic material.

The organic matrix usually contains polymerizable monomers, polymeric material, or a combination thereof. The composite particles can be mixed with previously formed polymeric material such as polyolefins, polyesters, polyurethanes, poly(meth)acrylates, polystyrenes, polycarbonates, polyimides, and the like. Alternatively, a polymeric material can be formed in the presence of the composite particles from polymerizable monomers.

Representative examples of polymerizable monomers that can be used to form the organic matrix of the composite material include (meth)acrylates, (meth)acrylamides, olefins, styrenes, epoxides and the like. Also, reactive oligomers such as acrylated or methacrylated polyesters, polyurethanes, or acrylics may also be used. The resulting composite material may be shaped or coated and then polymerized, for example, via a free-radical mechanism. Photopolymerization may be initiated by the use of a photoinitiator such as that commercially available from Ciba Specialty Chemicals, Tarrytown, N.Y. under the trade designation "IRGACURE" and "DAROCUR" or from BASF, Mt. Olive, N.Y. under the trade designation "LUCERIN". Other suitable polymerization initiators include, for example, organic peroxides, azo compounds, and the like.

The crosslinked polymeric shell of the composite particle can function to protect the particles from agglomeration when placed in an organic matrix. Further, the crosslinked polymeric shell tends to dictate the solubility properties of the composite particles as well as the compatibility with various binder systems and solvents. For example, polymeric crosslinked shells that are non-polar, such as those formed by crosslinking poly(benzyl ethers), tend to be compatible with organic matrixes such as, for example, polystyrene or poly (methyl methacrylate). In another example, polymeric crosslinked shells that are aliphatic, such as those formed by crosslinking poly(amidoamines), tend to be compatible with more polar organic matrixes such as polymethacrylic acid, polyacrylic acid, polyacrylamide, polymethacrylamide, and the like.

The composite particles or compositions that include the composite particles can be used for a variety of applications. For example, composite particles such as those that contain metal oxides can be used for catalysis of various chemical reactions of commercial importance and sensors. Additionally, the composite particles can be added to an organic matrix to alter the refractive index of the organic matrix, increase the x-ray opacity of the organic matrix, or both. In some examples, the organic matrix can remain optically transparent even though the refractive index or x-ray opacity has been increased.

EXAMPLES

These examples are for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Test Methods

TEM Analysis

An assessment of the particles sizes (and size distribution) for each type of material was performed using transmission electron microscopy (TEM). Once the initial survey images were obtained for each sample type, more detailed images were prepared for particle counting and sizing.

The samples that were analyzed using TEM were typically dispersed in a liquid. To perform the TEM analysis, the samples were shaken well and 2 microliters of the dispersion was placed onto a TEM grid using a micropipette. The TEM grids were ultrathin carbon/formvar microscopy grids that were obtained from Ted Pella, Inc., Redding, Calif. The ultrathin carbon/formvar grids were pre-treated by dipping the grids consecutively into acetone (5 seconds), chloroform (20 seconds), and acetone (5 seconds) to dissolve away the formvar region of the support film.

The electron micrographs were obtained using either a Model H9000 transmission electron microscope, operating at 300 kV, from Hitachi High Technologies America, Inc., Pleasanton, Calif., or a Model 200CX transmission electron microscope, operating at 200 kV, from JEOL-USA, Inc., Peabody, Mass. Digital images were recorded using a GATAN model 794 CCD camera. Bright field/dark field images were recorded for particle sizing and high resolution electron microscopy images (HREM) were used for verification of particle crystallinity and particle shape. The HREM imaging mode allowed for atomic resolution of the lattice spacing in the particles.

TEM bright field images were obtained from the transmitted beam when some or all of the scattered (diffracted) electron beam was blanked off with an objective aperture. Any features that caused the electron beam to scatter (such as a small particle, grain boundary or dislocation) or diffract (grain oriented in a diffracting condition) generally appeared dark in a TEM bright field image.

TEM dark field images were formed from a specific diffracted beam from the diffraction pattern of the particles being viewed. Using this technique, only information from a specific diffraction condition (e.g. from a particular particle oriented for strong diffraction) appeared bright. Additionally, any features that were scattering into the specific diffraction spot appeared bright (e.g. defects, grain boundaries, dislocations, stacking faults, or twins).

Preparative Example 1

A cored dendrimer containing eight interior carboxylic acid functional groups was prepared and characterized as detailed by S. C. Zimmerman et al., *Nature*, vol. 418, 399-403 (2002) and Wendland et al., *J. Am. Chem. Soc.*, 121, 1389-1390 (1999). The core organic material was 5,10,15,20-tetrakis(3,5-dihydroxylphenyl)-21H,23H-porphine. The dendrons attached to the core organic material had the following structure.

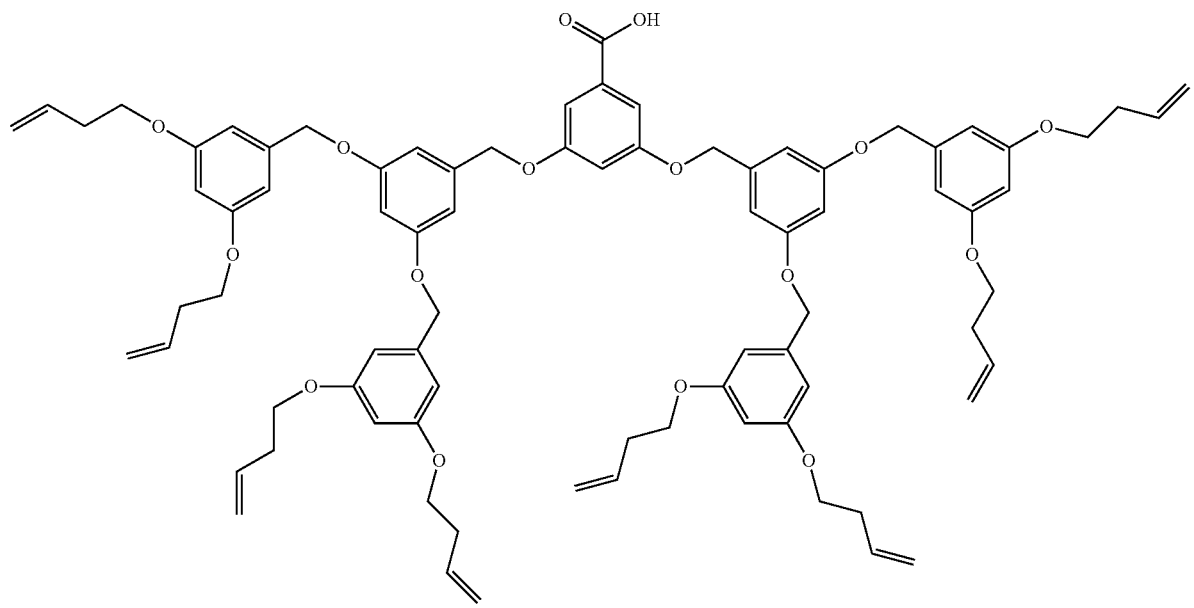 [SMILES: C=CCCOc1cc(COc2cc(COc3cc(OCc4cc(OCc5cc(OCCC=C)cc(OCCC=C)c5)cc(OCc5cc(OCCC=C)cc(OCCC=C)c5)c4)cc(C(=O)O)c3)cc(OCc3cc(OCCC=C)cc(OCCC=C)c3)c2)cc(OCCC=C)c1]

The attachment group was a carboxylate ester. The alkenyl crosslinkable groups on the dendrons were crosslinked using a Grubbs' ruthenium alkylidene catalyst. The attachment group was cleaved using potassium hydroxide in a tetrahydrofuran-water mixture.

Example 1

Figure 1B:
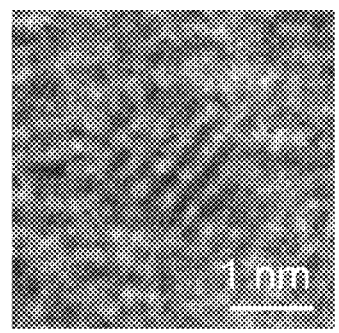

Potassium stannate (3.1 milligrams) was added to 100 microliters of water (potassium stannate only partially dissolved) in a 2 milliliter glass vial. To this mixture was added 515 microliters of a solution (0.001 moles/liter in chloroform) of the cored dendrimer prepared in Preparative Example 1. This mixture was shaken for 16 hours at room temperature on a wrist shaker in the capped vial. The cap of the vial was removed and replaced with a rubber septum. Carbon dioxide was bubbled through this mixture for 30 minutes. The resulting mixture was dried under reduced pressure and then subsequently dried under high vacuum (0.5 mm Hg) for 1 hour at room temperature. Two milliliters of chloroform were added to the dried residue. The resulting solution was filtered through a 0.2 micron filter (Life Sciences GHP ACRODISC 25 mm syringe filter with 0.2 micron GHP membrane). The contents of this filtered solution were analyzed by TEM. FIG. 1A is a TEM of Example 1 with a magnification of 400,000× and FIG. 1B is the same TEM with additional digital magnification. The tin oxide particles within the cored dendrimers had a size range of 1.5 to 2.0 nanometers.

Example 2

Figure 2A:
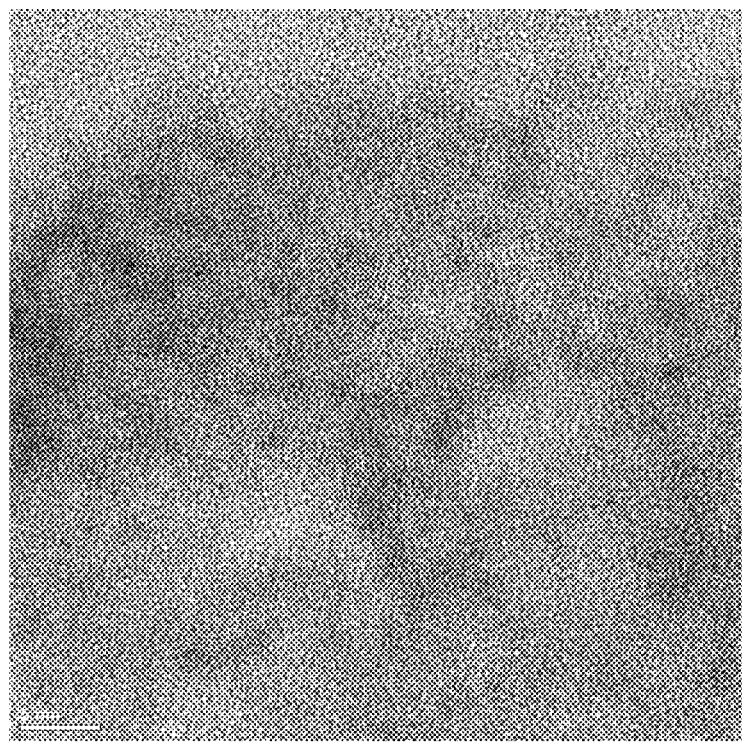
FIGS. 2A and 2B are transmission electron micrographs of a composite particle that contains aluminum oxide.
Figure 2B:
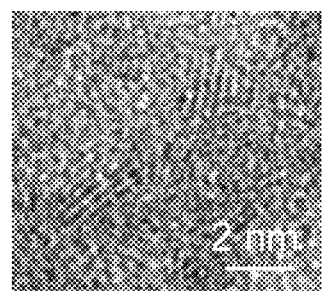

Sodium aluminate (4.4 milligrams) was dissolved in 500 microliters of water. 100 microliters of this solution was placed in a 2 milliliter vial. To this mixture was added 515 microliters of a solution (0.001 moles/liter in chloroform) of the cored dendrimer prepared in Preparative Example 1. This mixture was shaken for 16 hours at room temperature on a wrist shaker in the capped vial. The cap of the vial was removed and replaced with a rubber septum. Carbon dioxide was bubbled through this mixture for 30 minutes. The resulting mixture was dried under reduced pressure and then subsequently dried under high vacuum (0.5 mm Hg) for 1 hour at room temperature. Two milliliters of chloroform were added to the dried residue. This solution was filtered through a 0.2 micron filter (Life Sciences GHP ACRODISC 25 mm syringe filter with 0.2 micron GHP membrane). The contents of this filtered solution were analyzed by TEM. FIG. 2A is a TEM of Example 2 with a magnification of 400,000× and FIG. 2B is the same TEM with additional digital magnification. The aluminum oxide particles within the cored dendrimers had a size range of 1.5 to 2.0 nanometers.

Example 3

Figure 3:
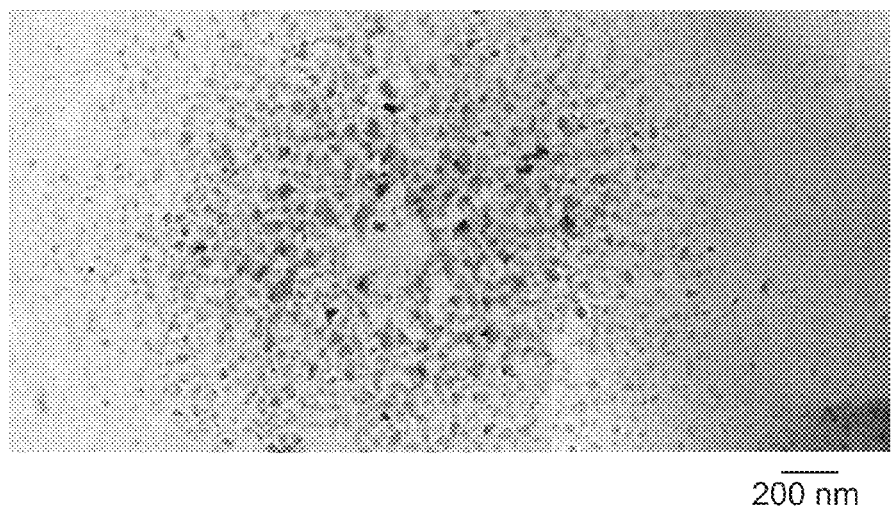
FIG. 3 is a transmission electron micrograph of a composite particle and aggregations of composite particles that contain zinc oxide.

A zinc ion solution was prepared by dissolving $Zn(NO_3)_2 \cdot 6H_2O$ in methanol at a concentration of 0.27 moles/liter. 100 microliters of this solution was placed in a 2 milliliter vial. To this mixture was added 500 microliters of a solution (0.002 moles/liter in chloroform) of the cored dendrimer prepared in Preparative Example 1 and 50 microliters of 1,2,2,6,6-pentamethylpiperidine (PMP). This mixture was stirred magnetically for 1 hour at room temperature in the capped vial. 125 microliters of 0.1 M aqueous NaOH was added to the vial, and the subsequent mixture was magnetically stirred with the capped vial suspended in an oil bath at 40° C. for 22 hours. TEM analysis demonstrated that the particles had an average size of 7.3 nanometers. The TEM with a magnification of 10,000× is shown in FIG. 3.

Example 4

Example 4 was a film that contained composite particles dispersed in polystyrene. The composite particles were those prepared in Example 3 (zinc oxide within cored dendrimers). The polystyrene had a weight average molecular weight ($M_w$) of 280,000 grams/mole. A chloroform solution of the composite particles of Example 3 and polystyrene was prepared such that the mass percentage of the solution was 0.6% composite particles and 1.5% polystyrene.

This solution was used to make an optically transmissive film of the composite particles dispersed in polystyrene via spin coating (1000 rpm, 120 seconds) onto a silicon wafer. The spin coater was manufactured by Laurell Technologies, Corp. North Wales, Pa.

We claim:

1. A composition comprising a composite particle, the composite particle comprising
    a cored dendrimer comprising crosslinked dendrons surrounding a central interior region that is free of organic material, and
    a metal oxide particle within the cored dendrimer, wherein the metal oxide particle has a size that is larger than the central region of the cored dendrimer that is free of organic material.

2. The composition of claim 1, wherein the metal oxide particle has a mean average particle size less than 50 nanometers.

3. The composition of claim 1, wherein the outer surface of the metal oxide particle is not bonded to the cored dendrimer.

4. The composition of claim 1, wherein the cored dendrimer comprises a crosslinked poly(benzyl ether).

5. The composition of claim 1, wherein the metal oxide particle comprises tin oxide or aluminum oxide, zinc oxide, iron oxide, titanium oxide or mixtures thereof.

6. The composition of claim 1, wherein the metal oxide particle has a size that is no greater than an outer dimension of the cored dendrimer.

7. A composition comprising a composite particle, the composite particle comprising
    a cored dendrimer comprising crosslinked dendrons surrounding a central interior region that is free of organic material;
    a metal oxide particle within the cored dendrimer; and
    an organic matrix, wherein the composite particle is dispersed or suspended in the organic matrix.

8. The composition of claim 7, wherein the organic matrix comprises a polymeric material, a polymerizable material, or a combination thereof.

9. The composition of claim 7, wherein the metal oxide particle has a size that is no greater than an outer dimension of the cored dendrimer.

* * * * *

UNITED STATES PATENT AND TRADEMARK OFFICE
CERTIFICATE OF CORRECTION

PATENT NO.       : 8,501,854 B2
APPLICATION NO.  : 13/100645
DATED            : August 6, 2013
INVENTOR(S)      : Michael S. Wendland et al.

It is certified that error appears in the above-identified patent and that said Letters Patent is hereby corrected as shown below:

In the Specification

Column 3
Lines 52-54, delete "The term............heterocycle." and insert the same on Col. 3, Line 53, below "–(CO)OH." as a new paragraph.

Lines 59-61, delete "The term..................alkoxy." and insert the same on Col. 3, Line 60, below "–SO$_2$Cl." as a new paragraph.

Lines 63-64, delete "The term..................or—I." and insert the same on Col. 3, Line 64, below "–(CO)H." as a new paragraph.

Column 4
Line 15, delete ""isocyanto"" and insert -- isocyanato --, therefor.

Line 24, delete "heterocylic." and insert -- heterocyclic. --, therefor.

Lines 35-36, delete "cAs used herein the term "sulfono" refers to monovalent group of formula —S(O)$_2$(OH)." and insert -- As used herein the term "sulfono" refers to monovalent group of formula —S(O)$_2$(OH). -- on Col. 4, Line 36, as a new paragraph.

Column 8
Line 46, delete "isocyanto." and insert -- isocyanato. --, therefor.

Column 9
Line 4, delete "ethyoxy" and insert -- ethoxy --, therefor.

Line 6, delete "C[CH$_2$(OCH$_2$CH$_2$)$_n$OH]$_n$" and insert -- C[CH$_2$(OCH$_2$CH$_2$)$_n$OH]$_4$ --, therefor.

Signed and Sealed this
Fifteenth Day of April, 2014

Michelle K. Lee
*Deputy Director of the United States Patent and Trademark Office*

Column 13
Line 15, delete "5" and insert -- S --, therefor.

Column 17
Lines 1-15 (Approx.),

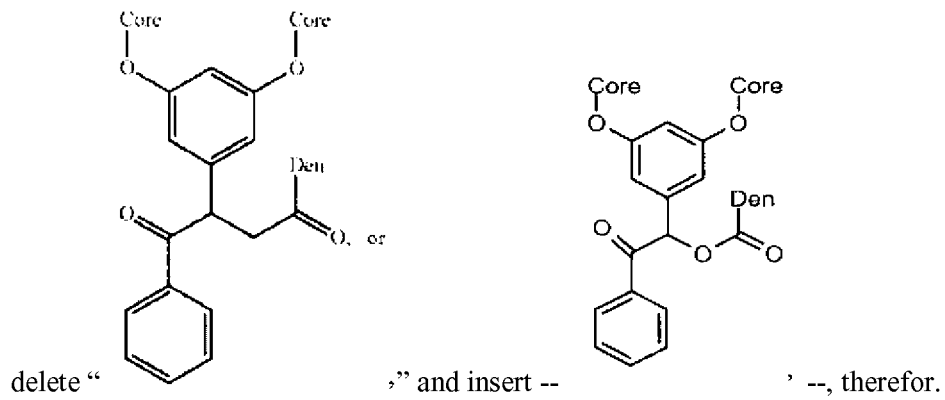

delete " " and insert -- -- , therefor.

Lines 20-30 (Approx.),

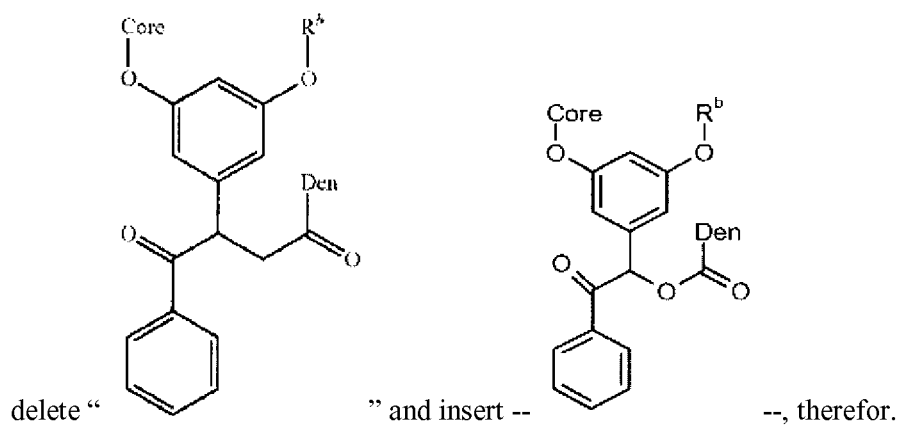

delete " " and insert -- -- , therefor.

Column 20
Line 36, delete "SN" and insert -- SH --, therefor.

Column 21
Line 16, delete "trifluormethylsulfonate" and insert -- trifluoromethylsulfonate --, therefor.

Line 54, delete "5" and insert -- S --, therefor.

Column 24
Line 16, delete "Core" and insert -- OH --, therefor.

CERTIFICATE OF CORRECTION (continued)
U.S. Pat. No. 8,501,854 B2

<u>Column 31</u>
Line 31, delete "thereof" and insert -- thereof. --, therefor.

Line 48, delete "Ullman" and insert -- Ullmann --, therefor.

Line 50, delete "thereof" and insert -- thereof. --, therefor.

<u>Column 35</u>
Line 21, delete "5" and insert -- S --, therefor.

<u>Column 36</u>
Line 20, delete "phosphormidites" and insert -- phosphoramidites --, therefor.

<u>Column 39</u>
Line 44, delete "then" and insert -- than --, therefor.